(12) United States Patent
Cornell et al.

(10) Patent No.: US 6,211,970 B1
(45) Date of Patent: Apr. 3, 2001

(54) BINARY PRINTER WITH HALFTONE PRINTING TEMPERATURE CORRECTION

(75) Inventors: Robert Wilson Cornell; Scott Michael Heydinger; James H. Powers, all of Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/198,703

(22) Filed: Nov. 24, 1998

(51) Int. Cl.[7] .......................... H04N 1/52; H04N 1/034; B41J 2/205; B41J 2/21
(52) U.S. Cl. .......................... 358/1.9; 358/1.8; 358/502; 358/521; 358/534; 347/14; 347/17; 347/15
(58) Field of Search .......................... 358/1.9, 502, 518, 358/519, 520, 521, 523, 534, 535–536; 347/14, 17, 15

(56) References Cited

U.S. PATENT DOCUMENTS 4,352,114   9/1982   Kyogoku et al. .
4,584,601   4/1986   Suzuki et al. .

(List continued on next page.)

OTHER PUBLICATIONS

Cornell, Robert, *A Theoretical and Experimental Examination of the Bubble Jet Energy Window*, IS&T's 47th Annual Conference/ICPS 1994, pp. 587–590.

Cornell, Robert, *A Theoretical and Experimental Examination of Thermal Ink Jet Nucleation Criteria*, IST&T's NIP 12: International Conference on Digital Printing Technologies, pp. 19–24.

Ruckdeschel, F. R. and Hauser, O. G., *Yule–Nielsen effect in printing: a physical analysis*, Applied Optics, vol. 17, No. 21, Nov. 1, 1978, pp. 3376–3383.

Arney, J. S., et al., *The Impact of Paper Optical Properties on Hard Copy Image Quality*, IS&T's NIP 12: International Conference on Digital Printing Technologies, 1996, pp. 166–168.

Foley, James D., et al., *Computer Graphics, Principles and Practice*, Second Edition, Addison–Wesley Publishing Company, 1991, pp. 564–567.

*The Photographic Process and Concepts*, The Seybold Report on Desktop Publishing, Oct. 2, 1991, pp. 4–14.

Dvorak, Charles A. and Hamerly, James R., *Just–Noticeable Differences for Text Quality Components*, 1983, Journal of Applied Photographic Engr. 9, Society of Photographic Scientists and Engineers, pp. 97–100.

Kubelka, Paul, *New Contributions to the Optics of Intensely Light–Scattering Materials. Part I*. Journal of the Optical Society of America, vol. 38, No. 5, May, 1948, pp. 448–457; and *New Contributions to the Optics of Intensely Light–Scattering Materials. Part III: Nonhomogeneous Layers*, pp. 330–335.

Parton, Kenneth and Berns, Roy S.; *Color Modeling of Ink–Jet Ink on Paper Using Kubelka–Munk Theory*, Proc. of IS&T 7th Int. Conf. Advances in Non Impact Printing Tech, Oct. 1991, pp. 271–280.

(List continued on next page.)

Primary Examiner—Scott Rogers
(74) Attorney, Agent, or Firm—D. Brent Lambert, Esq.

(57) ABSTRACT

A binary printer for printing halftone color images on a substrate so that the determination of whether to print a dot or to not print a dot of each color ink at each pixel location is based at least in part upon an estimated temperature of the print head. The temperature of the print head may be estimated based upon direct measurement of the ambient temperature and/or direct measurement of temperature of some portion of the print head. Alternatively, the temperature of the print head may be estimated by counting the number of dots fired by the print head.

24 Claims, 31 Drawing Sheets

U.S. PATENT DOCUMENTS

| | | |
|---|---|---|
| 4,758,897 | 7/1988 | Hiratsuka et al. . |
| 4,829,323 | 5/1989 | Suzuki et al. . |
| 4,860,034 | 8/1989 | Watanabe et al. . |
| 4,876,569 | 10/1989 | Nishitoku . |
| 4,896,172 | 1/1990 | Nozawal et al. . |
| 4,910,528 | 3/1990 | Firl et al. . |
| 4,980,699 | 12/1990 | Tanabe et al. . |
| 5,006,867 | 4/1991 | Koizumi et al. . |
| 5,107,276 | 4/1992 | Kneezel et al. . |
| 5,109,275 | 4/1992 | Naka et al. . |
| 5,142,302 | 8/1992 | Kano . |
| 5,168,284 | 12/1992 | Yeung . |
| 5,172,130 | 12/1992 | Takahashi . |
| 5,172,142 | 12/1992 | Watanabe et al. . |
| 5,175,565 | 12/1992 | Ishinaga et al. . |
| 5,223,853 | 6/1993 | Wysocki et al. . |
| 5,235,346 | 8/1993 | Yeung . |
| 5,300,969 | 4/1994 | Miura et al. . |
| 5,418,558 | 5/1995 | Hock et al. . |
| 5,475,405 | 12/1995 | Widder et al. . |
| 5,483,265 | 1/1996 | Kneezel et al. . |
| 5,553,200 | 9/1996 | Accad . |
| 5,559,535 | 9/1996 | Otsuka et al. . |
| 5,594,557 | 1/1997 | Rolleston et al. . |
| 5,610,638 | 3/1997 | Courtney . |
| 5,614,934 | 3/1997 | Yoshida et al. . |
| 5,627,572 | 5/1997 | Harrington, III et al. . |
| 5,633,671 | 5/1997 | Watanabe . |
| 5,646,655 | 7/1997 | Iwasaki et al. . |
| 5,658,471 | 8/1997 | Murthy et al. . |
| 5,661,510 | 8/1997 | Brandon et al. . |
| 5,661,514 | 8/1997 | Lukis et al. . |
| 5,673,069 | 9/1997 | Canfield et al. . |
| 5,684,516 | 11/1997 | Cseledy et al. . |
| 5,708,518 | 1/1998 | Parker et al. . |
| 5,745,132 * | 4/1998 | Hirabayashi et al. ................. 347/14 |
| 5,847,724 | 12/1998 | Mantell . |
| 5,903,289 | 4/1999 | Takayanagi . |
| 6,000,776 | 12/1999 | Suzuki et al. . |
| 6,022,093 | 2/2000 | Arai et al. . |
| 6,027,196 | 2/2000 | Gotoh et al. . |

OTHER PUBLICATIONS

Jodd and Wyszecki, "Physics and Psychophysics of Colorant Layers", Color In Business, Science & Industry, 1975, pp. 420–439.

Kang, Henry R., *Kubelka–Munk Modeling of Ink Jet Ink Mixing*, Journal of Imaging Technology, vol. 17, No. 2, Apr./May, 1991, pp. 76–83.

Ulichney, R., "Dithering with Blue Noise", Chapter 8, *Digital Halftoning*, MIT Press, 1990, pp. 233–243.

William A. Buskirk, et al., *Development of a High–Resolution Thermal Inkjet Printhead*, Hewlett–Packard Journal, 1988, pp. 55–61.

* cited by examiner

| NOMINAL CYAN COLOR VALUE (C) | TEMP = 35C CORRECTED VALUE (C') | TEMP = 40C CORRECTED VALUE (C') | TEMP = 45C CORRECTED VALUE (C') | TEMP = 50C CORRECTED VALUE (C') | TEMP = 55C CORRECTED VALUE (C') |
|---|---|---|---|---|---|
| 0 | 0 | 0 | 0 | 0 | 0 |
| 1 | 1 | 1 | 1 | 1 | 1 |
| 2 | 3 | 2 | 2 | 2 | 2 |
| 3 | 4 | 3 | 3 | 3 | 2 |
| 4 | 5 | 5 | 4 | 4 | 3 |
| 5 | 6 | 6 | 5 | 4 | 4 |
| 6 | 8 | 7 | 6 | 5 | 5 |
| 7 | 9 | 8 | 7 | 6 | 5 |
| 8 | 10 | 9 | 8 | 7 | 6 |
| 9 | 11 | 10 | 9 | 8 | 7 |
| 10 | 13 | 11 | 10 | 9 | 8 |
| 11 | 14 | 12 | 11 | 10 | 8 |
| 12 | 15 | 14 | 12 | 11 | 9 |
| 13 | 16 | 15 | 13 | 11 | 10 |
| 14 | 18 | 16 | 14 | 12 | 11 |
| 15 | 19 | 17 | 15 | 13 | 11 |
| 16 | 20 | 18 | 16 | 14 | 12 |
| 17 | 21 | 19 | 17 | 15 | 13 |
| ... | ... | ... | ... | ... | ... |
| 248 | 255 | 255 | 248 | 217 | 186 |
| 249 | 255 | 255 | 249 | 218 | 187 |
| 250 | 255 | 255 | 250 | 219 | 188 |
| 251 | 255 | 255 | 251 | 220 | 188 |
| 252 | 255 | 255 | 252 | 221 | 189 |
| 253 | 255 | 255 | 253 | 221 | 190 |
| 254 | 255 | 255 | 254 | 222 | 191 |
| 255 | 255 | 255 | 255 | 223 | 191 |

FIG. 5A

| NOMINAL MAGENTA COLOR VALUE (M) | TEMP = 35C CORRECTED VALUE (M') | TEMP = 40C CORRECTED VALUE (M') | TEMP = 45C CORRECTED VALUE (M') | TEMP = 50C CORRECTED VALUE (M') | TEMP = 55C CORRECTED VALUE (M') |
|---|---|---|---|---|---|
| 0 | 0 | 0 | 0 | 0 | 0 |
| 1 | 2 | 1 | 1 | 1 | 0 |
| 2 | 3 | 2 | 2 | 2 | 1 |
| 3 | 4 | 3 | 3 | 3 | 2 |
| 4 | 5 | 4 | 4 | 4 | 3 |
| ... | ... | ... | ... | ... | ... |
| 253 | 255 | 254 | 253 | 252 | 250 |
| 254 | 255 | 255 | 254 | 253 | 252 |
| 255 | 255 | 255 | 255 | 255 | 255 |

FIG. 5B

| NOMINAL YELLOW COLOR VALUE (Y) | TEMP = 35C CORRECTED VALUE (Y') | TEMP = 40C CORRECTED VALUE (Y') | TEMP = 45C CORRECTED VALUE (Y') | TEMP = 50C CORRECTED VALUE (Y') | TEMP = 55C CORRECTED VALUE (Y') |
|---|---|---|---|---|---|
| 0 | 0 | 0 | 0 | 0 | 0 |
| 1 | 1 | 1 | 1 | 1 | 1 |
| 2 | 2 | 2 | 2 | 2 | 2 |
| 3 | 3 | 3 | 3 | 3 | 3 |
| 4 | 5 | 4 | 4 | 4 | 3 |
| ... | ... | ... | ... | ... | ... |
| 253 | 254 | 253 | 253 | 253 | 252 |
| 254 | 254 | 254 | 254 | 254 | 254 |
| 255 | 255 | 255 | 255 | 255 | 255 |

FIG. 5C

| COUNT VALUE (I) | ESTIMATED PRINT HEAD TEMP (T) |
|---|---|
| 0 TO 24,999 | 35 |
| 25,000 TO 49,999 | 40 |
| 50,000 TO 74,999 | 45 |
| 75,000 TO 99,999 | 50 |
| 100,000 TO 200,000 | 55 |

FIG. 6

BINARY PRINTER WITH HALFTONE PRINTING TEMPERATURE CORRECTION

FIELD OF THE INVENTION

The present invention is directed to an ink jet printer for printing halftone images in color. More particularly, the present invention is directed to a color ink jet printer where color values are corrected in order to compensate for temperature variations in the print head. According to the present invention, the determination of whether a dot of each color is printed at each pixel location of a halftone image area is based in part upon the estimated temperature of the print head.

BACKGROUND OF THE INVENTION

In color ink jet printing, very small dots of colored ink are transmitted from the print head to the substrate (e.g., paper) by heating a portion of the ink which is in the proximity of a nozzle in the print head. Heating the ink will cause a bubble to form. The formation of the expanding bubble pushes a droplet of ink out through the nozzle, and thence to the substrate.

By printing patterns of these small dots of colored ink, halftone images can be formed. Conventionally, at least three different primary color inks are used. For example, many color ink jet printers use cyan, magenta and yellow as the three primary colors. By halftone printing a combination of the primary colors in a given area of the image, a multitude of different colors can be achieved by controlling the coverage of each of the primary colors in the given area. In order to control the coverage of each primary color, the number of dots of each primary color is controlled. Printing more dots of a primary color in the area will give greater coverage by that primary color. Printing fewer dots will give less coverage. In this way, full color halftone images are achieved with an ink jet printer.

Accordingly, the number of dots of each primary color within various portions of the image are controlled depending on the image data. The image data is stored in the form of pixels, where each pixel has color values for each primary color. For example, a pixel of image data may include a cyan value (0 to 255), a magenta value (0 to 255) and a yellow value (0 to 255). Now, a pixel corresponds to an area of the image so small that only a single dot of each primary color can be printed (or not printed) at the pixel location. Therefore, a halftone algorithm is used to convert the color value for the pixel into a determination of whether or not a dot of the particular primary color will actually be printed at the pixel location.

Conventional halftone algorithms are mathematically and/or statistically complex. Some conventional halftone algorithms include Bayer, Floyd-Steinberg, Blue Noise Mask. Detailed explanation of various conventional halftone algorithms is not necessary here. However, it is noted that although the color values for a pixel have a great influence over whether a dot of each primary color will actually be printed at that pixel location, other factors may also be involved, such as color values of pixels elsewhere in the image data or a pixel-by-pixel comparison with a masking matrix, such as a Bayer matrix. For example, U.S. Pat. No. 5,708,518 (the entire specification of which is herein incorporated by reference) to Parker et al. discusses the use of such a masking matrix to determine whether a dot is printed at each pixel location in a halftone image.

Despite the complexity engendered by conventional halftone algorithms, some rough generalizations hold true. Specifically: (1) an area of the image data which is characterized by high color values for a particular primary will tend to have many dots of that primary color printed at corresponding pixel locations on the substrate, (2) an area of the image data which is characterized by low color values for a particular primary will tend to have relatively few dots of that primary color printed at corresponding pixel locations on the substrate, (3) areas which are characterized by intermediate color values or a mixture of high, low and intermediate color values will tend to have an intermediate number of dots.

The color values, used in conjunction with halftone algorithms, control the number of dots printed of each primary, and thereby indirectly control the coverage on the substrate of each primary color. This scheme works well to predictably reproduce colors as long as the coverage provided by each dot remains fairly predictable and constant. In order for dot coverage to remain fairly predictable and constant, the mass of ink in each droplet ejected by the print head must remain fairly predictable and constant. If the droplet mass varies, then coverage will vary, and the colors produced on the substrate will also vary.

One phenomenon which causes droplet mass to vary is temperature of the print head. Increased print head temperature affects the mechanics of ink flow and bubble formation such that larger droplets of ink are produced. Conversely, decreased temperature affects the mechanics of ink flow and bubble formation such that smaller droplets of ink are produced.

This temperature variation and consequent droplet mass variation is problematic for two reasons. First, if the print head temperature during actual printing is different than the print head temperature assumed in generating the color values of the image data and the halftone algorithm, then the colors of the printed image will not correspond well with the image data. Second, the print head temperature may vary during the actual printing process and cause variations within a single printed image. The variations within an image may be variations within each swath, and/or variations from between the swaths.

Various concepts have been proposed to grapple with the problem of print head temperature variation.

It has been proposed to slow the speed of the print head, lengthen the time interval (i.e., period) between which dots are ejected, and/or provide intermittent time intervals of rest for the print head during the printing process. The idea behind these proposals is that the print head will have time to cool and thereby counter heat buildup which can be caused by repeated firing. These proposals may indeed keep print head temperature relatively constant within a single image by countering heat buildup. However, printing is slowed, which is generally undesirable. Also, temperature must be kept within a range of about 5° C. to prevent noticeable variations. This is quite difficult to do, especially when the print head may fire tens of thousands of times over the course of a single swath.

Thermostatically controlled heaters to maintain the print head at a relatively constant temperature have been proposed. This proposal requires additional heater and thermostat hardware, and may be difficult to implement in practice.

Another proposal involves control, based on print head temperature, of the firing energy which is supplied to the print head to print each dot. For example, U.S. Pat. No. 5,614,934 to Yoshida et al. discloses a sublimation type printer wherein the energy supplied to the sublimation type print head is controlled based upon temperature. While this may work well for sublimation type printers, it may be more difficult to implement this type of design in ink jet printers because the mechanics of bubble generation in a thin film of liquid ink make it difficult to precisely control droplet mass by controlling the firing energy.

In view of the difficulties and potential shortcomings in the various proposals, there is a need for an ink jet printer which accounts for temperature variations in the print head.

SUMMARY OF THE INVENTION

Accordingly, it is an object of the present invention to provide a color ink jet print head which uses the nominal color values of image data to determine corrected color values based upon temperature, and then uses the corrected color values in a halftone algorithm to determine whether a dot is printed at each pixel location. It is a further object to provide a color ink jet printer wherein the number of dots which are printed in a printed halftone image will depend upon an estimated temperature of the print head.

It is an advantage of the present invention that coverage of each primary color on the substrate may be controlled despite variations in print head temperature. It is a further advantage of the present invention that colors may be accurately and uniformly produced on the substrate despite variations in the print head temperature.

In some embodiments of the present invention, the corrected color values are determined through the use of look-up tables which have corrected color values. An advantage of these embodiments of the present invention is that the calculation and processing to determine corrected color values may be reduced.

In some embodiments of the present invention, the print head temperature is estimated based on the number of droplets previously fired or upon the binary color values (which correspond with the number of droplets previously fired). An advantage of these embodiments of the present invention is that hardware to directly measure temperature of the print head and errors caused by inaccurate direct measurement of print head temperature may be avoided.

These and additional objects and advantages are provided by the printer according to the present invention. Generally, the color ink jet printer according to the present invention comprises an ink jet print head, an image data storage device, a temperature estimation unit, and an image data processing unit.

The ink jet print head prints dots of ink of (at least) a first color and a second color on a substrate to make a halftone image on the substrate. The image storage device stores image data in the form of pixels. The image data for each pixel includes at least two nominal color values. For example, the image data storage device may be a portion of a conventional printer random access memory (RAM).

The temperature determination unit determines an estimated temperature of the print head. In some embodiments, the temperature determination unit includes a device for directly measuring temperature of the print head. In some embodiments, the temperature determination device estimates the temperature based on color values of pixels elsewhere in the image data.

The image data processing unit receives the nominal color values for a pixel from the image storage device and the estimated temperature from the temperature estimation unit. The image data processing unit uses the nominal color values and the estimated temperature to determine corrected color values.

The image processing unit also determines binary color values which can be used to directly determine whether or not the print head will fire a dot of a given primary color at a given pixel location. The color correction unit applies the corrected color values to a halftone algorithm to determine binary color values in a way which compensates for print head temperature. Alternatively, the color correction unit may adjust values of the halftone algorithm itself to compensate for print head temperature. For example, the color correction unit can adjust values of a threshold array of a halftone algorithm based upon print head temperature.

In some embodiments, there will be more than two colors. For example, some embodiments of the present invention will utilize cyan, magenta and yellow colors as the primary colors. Additional colors, such as black, or alternative colors such as red, blue or green are also possible.

Still other objects of the present invention will become readily apparent to those skilled in this art from the following description wherein there is shown and described a preferred embodiment of this invention, simply by way of illustration, of one of the best modes contemplated for carrying out this invention. As will be realized, the invention is capable of other different embodiments, and its several details are capable of modification in various aspects all without departing from the invention. Accordingly, the drawings and descriptions will be regarded as illustrative in nature and not as restrictive.

BRIEF DESCRIPTION OF THE DRAWINGS

The present invention as set forth in the detailed description will be more fully understood when viewed in connection with the drawings in which:

FIGS. 5a to 5c are embodiments of color correction look-up tables for use in conjunction with the present invention;

FIG. 6 is an embodiment of a temperature estimation look-up table for use in conjunction with the present invention;

DETAILED DESCRIPTION OF THE PREFERRED EMBODIMENTS

The present invention will be explained with respect to a preferred three color ink jet printer embodiment which includes a conventional three-color ink jet print head (cyan, magenta, yellow) and conventional means for handling a paper substrate, for storing halftone color image data and for actuating the print head relative to the substrate. These portions of the printer will not be described in great detail herein.

The printer also includes color correction and print head driver units for converting the color values of the stored image data into binary color values on a pixel-by-pixel basis in a way which accounts for the effects of print head temperature. The printer further includes a temperature estimation unit for estimating the print head temperature based on previous binary color values. The estimated temperature estimated by the temperature estimation unit allows the color correction unit to then appropriately compensate for this estimated print head temperature.

Figure 1:
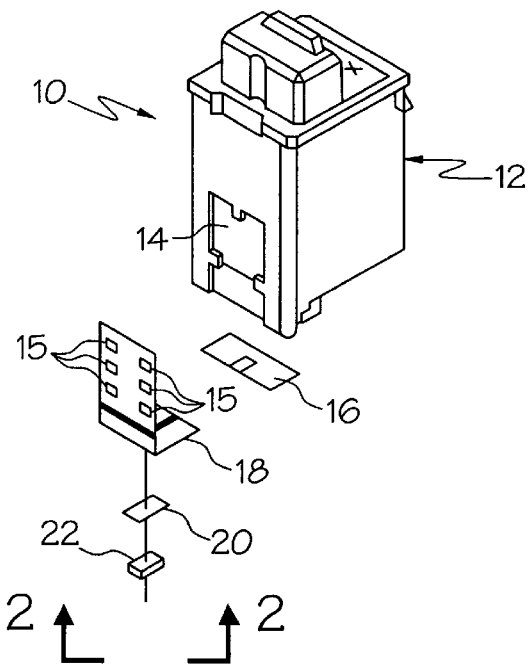
FIG. 1 is an exploded view of an ink jet print head according to the present invention.

The print head 10 is shown in FIG. 1. The print head 10 includes a body 12, two adhesive preforms 14, 16, a print head driver input 15, a tab circuit 18, a heater chip 20 and a nozzle plate 22. During each swath of a print job, the substrate is moved longitudinally relative to the printer so that it is positioned for the swath. Once the substrate is in position, the print head body 12 moves along a conventional print head carriage (not shown) in a direction transverse to the longitudinal direction while firing droplets of ink onto the substrate (not shown) surface. The print head may make one or more of these transverse passes to complete printing for the swath. After the swath is complete, the paper position is adjusted longitudinally for the printing of the next swath.

Figure 2:
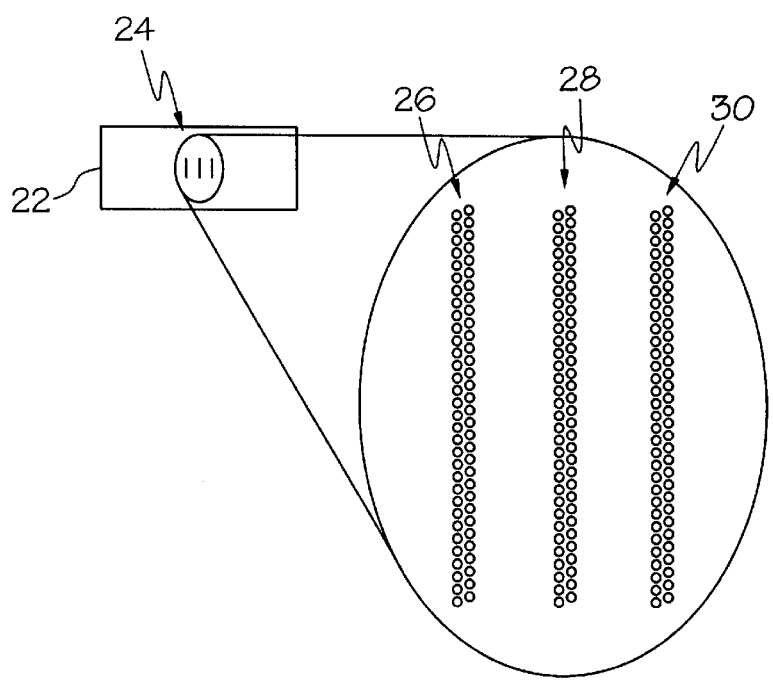
FIG. 2 is a view of the nozzle plate 22 from the direction of arrow II in FIG. 1.

To describe the firing of droplets in more detail, ink of each primary color (C: cyan, M: magenta and Y: yellow) is fed through the body 12 via a system of ducts (not shown) to the vicinity of the nozzles 24 of the nozzle plate 22. According to binary color values generated from the color values of the image data, the heater chip 20 selectively heats at different portions to vaporize ink in the vicinity of the appropriate nozzles 24 at various times during the transverse pass of the print head. As shown in more detail in FIG. 2, there are 64 cyan nozzles 26, 64 magenta nozzles 28 and 64 yellow nozzles 30. Each set of 64 nozzles 26, 28, 30 is arranged in two rows of 32 nozzles.

More specifically, a binary color value of 1 (one), which corresponds with a given nozzle will cause the heater chip 20 to vaporize ink, causing a bubble, and thereby causing a droplet of ink to be fired from the nozzle. On the other hand, a binary value of 0 (zero) will not cause the heater chip to heat so that no droplet will be fired at that location. In some preferred embodiments of the present invention, the print head will print at 300 or 600 dots per inch (dpi).

The printing pulses corresponding with the binary color values are received by the print head 10 through the print head driver input 15 on the tab circuit 18. The tabs of the tab circuit 18 are connected to heaters on heater chip 20 and effect selective heating of the heater chip 20 and consequent firing of droplets of the primary color inks through the nozzles 24 based upon the received binary color values.

Binary halftone images are built up by selectively firing droplets and forming dots at each pixel location. At each pixel location any combination of primary colors (or no primary colors at all) may be deposited by the print head. More specifically, at each pixel location, the eight possible combinations are: (1) CMY, (2) CM, (3) CY, (4) MY, (5) C, (6) M, (7) Y and (8) no dots (blank space).

Although only eight color combinations are possible at each pixel location, over a larger area, many more color combinations are possible. As an example, take an area made up of 255 pixels. In this area, any number from 0 up to 255 dots of cyan may be printed. Likewise, any number from 0 up to 255 dots of magenta and yellow respectively may also be printed. This gives rise to 16.7 million ($256^3$) combinations of dot quantities in this 255 pixel area, and 16.7 million resulting shades of color.

In the preferred embodiment of the present invention, each pixel has its own discrete set of three color values (e.g., C=0 to 255, M=0 to 255, Y=0 to 255). The color values may be helpfully conceptualized as a probability that a dot of that color will be printed at that pixel location.

For example, if the pixel has a cyan color value of 0, then there is a $0/255$ probability that a cyan dot will be printed. If the pixel has a cyan color value of 100, then there is a $100/255$ probability that a cyan dot will be printed at that location. If there is a very large area of the image wherein the cyan color values for each pixel are uniformly 100, then something close to 100 dots of cyan will be printed over every 255 pixel portion of the area.

A halftone algorithm will convert the color values of the image data into binary color values, which direct the print head 10 to print or to not print a dot of each primary color on a pixel-by-pixel basis. That is, because the color values are not generally uniform over an entire image, but rather the color values are different for each pixel, the halftone algorithm will assign binary color values (i.e., binary color value=0 or 1) in a way such that the probability that a dot of each color will be printed at each pixel location will correspond with the color values (0 to 255) for that pixel.

At this juncture, it is noted that this kind of binary halftone printing is popular because it allows generation of a multitude of colors by merely printing or not printing dots of the primary colors at each pixel location. Dot size does not need to be adjusted, which allows a simpler print head design because ink flow does not need to be mechanically adjusted to effect different droplet (and consequent dot) sizes.

This scheme for printing halftone, color images by selectively printing (or selectively not printing) dots of two or more primary colors at each pixel location is herein called binary halftone color printing. When this scheme is accomplished by an ink jet printer, the process is herein referred to as binary halftone ink jet printing. Any method by which non-binary color values are converted into binary color values is herein referred to as a halftone algorithm (e.g., use of a Bayer matrix).

It is noted that this binary halftone printing is different than a continuous tone ink jet printing, wherein the size of each dot is adjusted based upon color values. Continuous tone halftone printing does not employ a halftone algorithm (as that term is herein defined) because binary color values are not used inasmuch as color values which convey the appropriate dot size are required, rather than binary color values.

However, because binary printing does not provide for the adjustment dot size, if variations in print head temperature causes variation in droplet mass and consequent dot size, this will adversely affect the accuracy and/or uniformity of the printed image. According to the present invention, color correction and print head driver units convert color values of the image data into binary color values which are input to the print head in a way which compensates for print head temperature, and thereby minimizes or avoids adverse affects caused by print head temperature variation.

Figure 3:
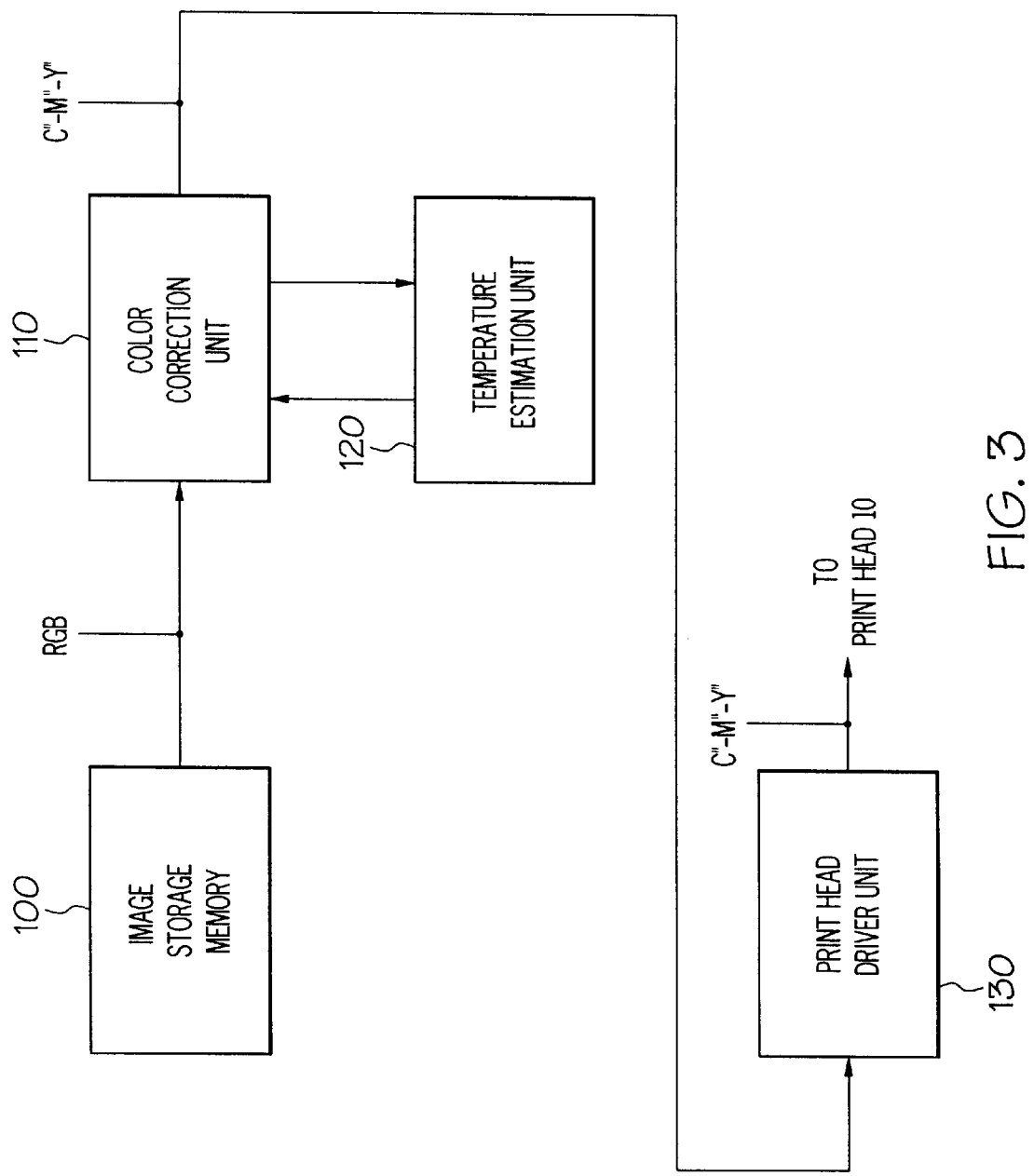
FIG. 3 is a block diagram of an image processing apparatus according to the present invention.

FIG. 3 is a block diagram depicting a system for compensating for thermally induced droplet mass variations according to the present invention. Image data made up of pixels having three nominal RGB color values (R, G, B) is stored in image storage memory 100. Alternatively, the image data can be expressed in other color spaces such as L*a*b*.

The nominal RGB color values of the image data are sent to the color correction unit 110, where they are converted into nominal CMY color values (C, M, Y). Also in the color correction unit 110, the nominal CMY color values are converted into corrected color values (C', M', Y'). Finally in the color correction unit 110, a halftone algorithm is applied to the corrected color values (C', M', Y') to determine binary color values (C", M", Y").

The corrected color values (C', M', Y') are determined on the basis of an estimated print head temperature (T), which is received from the temperature estimation unit 120. The temperature estimation unit 120 estimates the print head temperature based on binary color values (C", M", Y") for a plurality of previously printed pixels. The previous binary values allow a fairly accurate temperature estimation because the print head 10 is primarily heated by heat generated by the heater chip when the heater chip fires droplets of ink. Because the binary color values correspond with heating of the heater chip, the binary color values can be used to estimate temperature.

The binary color values (C", M", Y") are sent from the color correction unit 110 to the print head driver unit 130. The print head driver unit 130 temporarily stores the binary color values (C", M", Y") and sends them out to the print head 10 at appropriate timings so that the print head 10 prints dots of the various primary colors at the correct pixel locations on the substrate.

Figure 4:
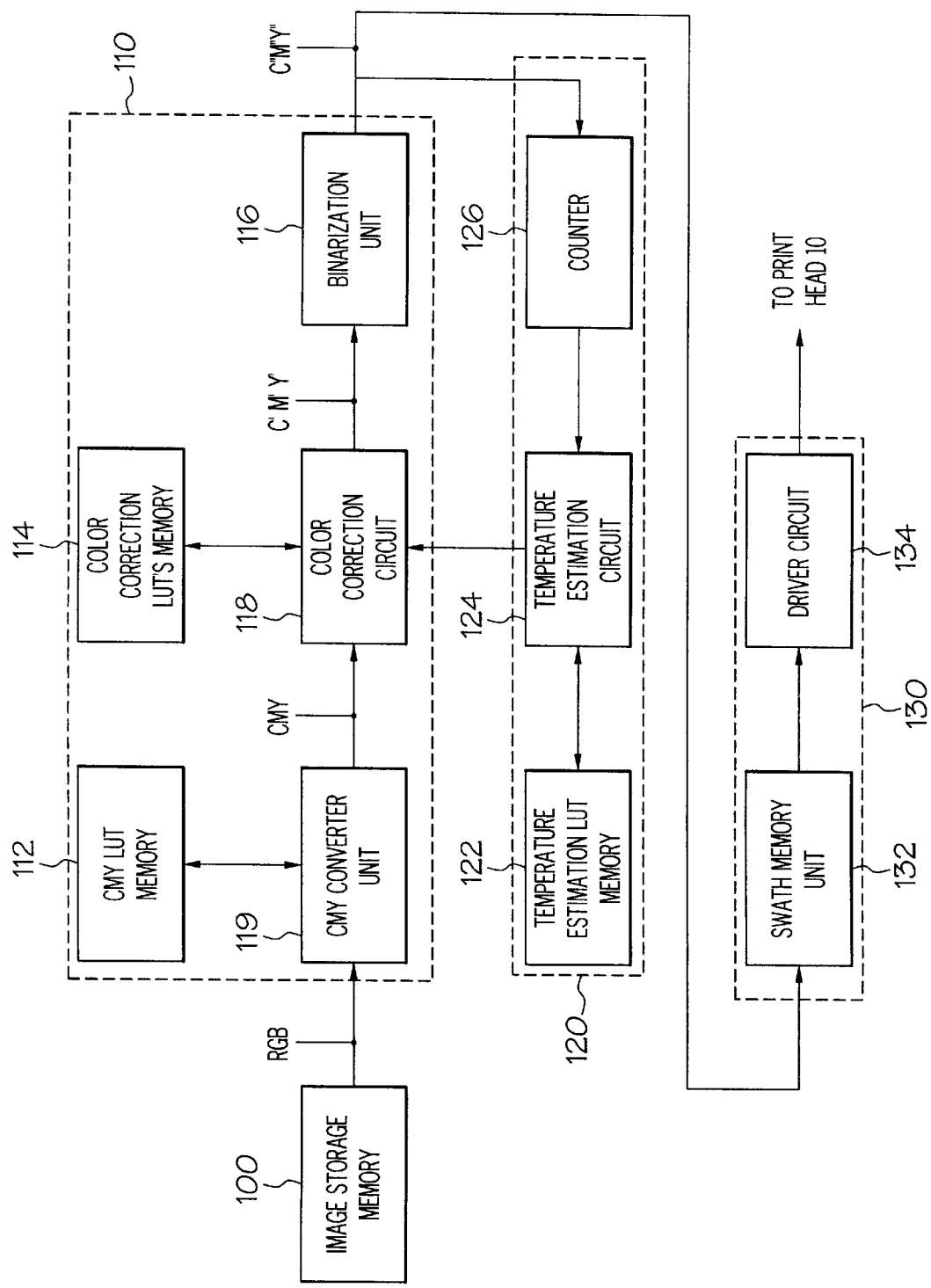
FIG. 4 is a more detailed block diagram corresponding to the block diagram of FIG. 3.

The system of FIG. 3 will now be explained in greater detail with reference to FIG. 4. As shown in FIG. 4, source image data is stored, as nominal RGB color values in the image storage memory 100. In this embodiment, the image storage memory 100 is a conventional random access memory or a portion of a conventional random access memory. The image data may be supplied to the image storage memory 100 from a number of devices (not shown), such as a computer or processor having software applications for generating source image data with appropriate color values, or other imaging devices such as video cameras or scanners. The image storage memory 100 is typically at least large enough to hold a number of pixels corresponding to one swath of the image.

The color correction unit 110 includes cyan-magenta-yellow (CMY) look-up table (LUT) memory 112, a color correction LUT's memory 114, a binarization unit 116, a color correction circuit 118 and a CMY converter unit 119.

The CMY converter unit 119 receives the image data, in the form of nominal RGB color values, from the image storage memory 12, preferably one "slice" at a time. (As used herein, the term "slice" refers to a portion of data one print head pass high and one pixel wide.) The CMY converter unit 116 utilizes a look-up table stored in the CMY LUT memory 112 to convert the nominal RGB color values into nominal CMY color values. In this preferred embodiment, the CMY color values include three 8-bit (0 to 255) values respectively for cyan, magenta and yellow at each pixel.

The nominal CMY color values are then sent from the CMY converter unit 119 to the color correction circuit 118. The color correction circuit 118 uses the nominal CMY values (C, M, Y) and an estimated print head temperature (T) to look up corrected color values (C', M', Y') from among the look-up tables stored in the color correction LUT's memory 114.

More specifically, a plurality of look-up tables, as shown in FIGS. 5a to 5c, are stored in the color correction LUT's memory 114. As shown in FIG. 5a, there are five tables with corrected cyan values (C') respectively designed for estimated print head temperatures of 35° C., 40° C., 45° C., 50° C. and 55° C.

In these sample look-up tables, 45° C. corresponds with the expected nominal print head temperature upon which the nominal RGB color values and nominal CMY color values are based. Therefore, the values from the 45° C. color table (see FIG. 5a at column 4) are equal to the nominal cyan values which are input to the table (see FIG. 5a at column 1). However, the estimated print head temperatures (T) supplied by the temperature estimation unit 120 may be greater or less than 45° C. Therefore, the color correction unit 118 will select the color table (Temp=35, 40, 45, 50, 55° C.) which is closest to the estimated print head temperature (T).

With the estimated print head temperature (T) and the nominal cyan color value (C=0 to 255) as inputs, the color correction unit 118 selects the appropriate corrected cyan color value (C') as an output from among the cyan color correction look-up tables.

Because lower temperatures cause less massive droplets and smaller printed dots, the corrected cyan color tables for temperatures lower than 45° C. reflect corrected cyan values (C') which are generally greater than the nominal cyan values (C). These greater values for the corrected cyan color values (C') make it somewhat more likely that the halftone algorithm will determine that a cyan dot should be printed at that pixel location, and accordingly make it somewhat more likely that a binary cyan color value (C") of 1 will be determined by the halftone algorithm. Over a large area printed with a low estimated print head temperature (T), there will be a tendency to print a somewhat greater number of dots of cyan which effectively compensates for the substrate coverage lost by virtue of the fact that the dots will be somewhat smaller.

On the other hand, because higher temperatures cause more massive droplets and larger printed dots, the corrected cyan color tables for temperatures higher than 45° C. reflect corrected cyan values (C') which are generally lower than the nominal cyan values (C). These lower values for the corrected cyan color values (C') make it somewhat less likely that the halftone algorithm will determine that a cyan dot should be printed at that pixel location, and accordingly make it somewhat less likely that a binary cyan color value (C") of 1 will be determined by the halftone algorithm. Over a large area of substrate printed by a print head with a high estimated print head temperature (T), there will be a tendency to print a somewhat lower number of dots of cyan which effectively compensates for the increase in substrate coverage resulting from the fact that the dots will be somewhat larger.

While this preferred embodiment is limited to five cyan corrected color tables for temperatures of 35, 40, 45, 50 and 55° C, it is noted that there may be greater or fewer look-up tables, that the temperature range of the look-up tables may be changed (e.g., to better correlate with print head temperatures experienced in practice) and that there may be smaller increments of temperature between the look-up tables. The corrected cyan color values (C') in the look-up tables should be optimized so that the corrected cyan values (C') yield good results at various print head temperatures.

The corrected magenta color tables (see FIG. 5b) and the corrected yellow color values (see FIG. 5c) are similar to the corrected cyan color table explained above. It is noted that the corrected magenta and yellow tables also generally have higher corrected values in the lower temperature table and lower corrected values in the higher temperature tables.

However, as shown in FIGS. 5a to 5c, the actual look-up table entries for corresponding temperatures and input color values are not always equal for different colors between the cyan, magenta and yellow tables. Such differences between the tables may be used to account for different ink flow characteristics for the different ink colors, differences in the optical physics of the different ink colors and differences in the way the human eye perceives the different primary colors.

In embodiments where the corrected color values are the same for each primary color, only one set of corrected color value look-up tables would be necessary for all three colors.

In some embodiments of the present invention, each of the corrected color values (C', M', Y') may be a function of all three nominal color values. In mathematical notation: C'=f (T, C, M, Y), rather than C'=f(T, C) as in the preceding example. While this kind of color table may give superior results, these color tables may take up considerably more memory, particularly if all 16.7 million CMY combinations are separately provided for as table entries.

After the color correction circuit 118 has determined corrected color values (C', M', Y'), these values are sent to the binarization unit 116. The binarization unit 116 applies a halftone algorithm to the corrected color values (C', M', Y') to determine binary color values (C", Y", M"). Each of these binary color values has a value of 0 or 1, and this value will determine whether a dot of that color will be printed (binary color value=1) or will not be printed (binary color value=0) at the corresponding pixel location.

In this preferred embodiment, each pixel position is assigned a threshold value, such as that from a conventional Bayer matrix. If the corrected cyan color value (C') is larger than the corresponding threshold value, then the binary cyan color value (C") will be 1 so that a cyan dot is printed at that pixel location. Conversely, if the corrected cyan color value (C') is less than the corresponding threshold value, then the binary cyan color value (C") will be 0 so that a cyan dot is not printed at that pixel location. Similarly, binary magenta color values and binary yellow color values are also assigned in the binarization unit 116.

Although, the binarization unit 116 of this preferred embodiment employs a Bayer matrix as a masking matrix, other masking matrices may be used, and completely different halftone algorithms which do not employ a masking matrix at all may be used.

Also, this preferred embodiment utilizes the estimated temperature (T) to determine corrected color values (C', M', Y') which are then applied in a halftone algorithm. Alternatively, the estimated print head temperature (T) may be used to correct the halftone algorithm itself. For example, the estimated print head temperature (T) may be used to adjust the values of the masking matrix in a way which compensates for temperature. Whether corrected color values are used or the halftone algorithm itself is adjusted, the determination of binary halftone color values (C", M", Y") is based upon estimated temperature of the print head.

The binary color values (C", M", Y") are sent from the binarization unit 116 to be temporarily stored in the swath memory unit 132. The driver circuit 134 sends appropriate driving pulses to the print head 10 based on the binary color values (C", M", Y") in a conventional manner. These driving pulses will direct that a dot of each primary color should be printed (or not printed) at each pixel location on the substrate. Because the driving pulses are based on the binary color values (C", M", Y"), which in turn are based on the corrected color values (C', M', Y'), which in turn are based on the estimated print head temperature, the number of dots printed will effectively compensate for changes in dot size caused by print head temperature variation.

As stated above, the temperature estimation unit 120 supplies an estimated print head temperature (T) for use in color correction. The temperature estimation unit 120 includes a temperature estimation LUT memory 122, a temperature estimation circuit 124 and a counter 126. The estimated temperature is determined as follows. At the beginning of a swath, the counter 126 is reset to zero. The counter 126 receives binary color values (C", M", Y") for the swath being processed from the binarization unit 116. Each time a binary color value of 1 encountered, the counter is incremented.

The count value (I) of the counter 126 is sent to the temperature estimation circuit 124. The temperature estimation circuit 124 uses the count value (I) of the counter as an input to determine an estimated temperature of the print head (T) from a temperature estimation look-up table stored in a temperature estimation look-up table memory 122. An example of a temperature estimation look-up table is shown in FIG. 6.

The estimated temperature (T) is sent from the temperature estimation circuit 124 to the color correction circuit 118 so that corrected color values (C', Y', M') may be obtained for the next pixel. This process is repeated until the end of the swath when the counter 126 again resets.

The reasons that this method can be used to estimate temperature is that print head temperature is primarily a function of the number of times that the print head is fired during the printing of one swath. Each time the print head fires, a portion of the heater chip is heated. This heat accumulates to increase print head temperature in a somewhat predictable fashion. For this reason, estimated print head temperature (T) will increase with an increase in the number of times a binary color value is equal to one, as shown in FIG. 6.

Each time the end of a swath is reached, there is an interval of rest where the print head does not fire, so the temperature of the print head will drop back down to some equilibrium value. This is the reason that the counter 126 is reset to zero at the beginning of each swath. When there is no temperature compensation, there is a tendency for larger dots and greater coverage in the later portion of the swath. This can cause the image to be non-uniform. By continually estimating the temperature rise over the course of the swath, this type of non-uniformity can be minimized or avoided.

Of course, the values in the temperature estimation lookup table will vary depending on the thermal characteristics of the print head. Also, the resolution of the estimated temperatures provided by the look-up table may be increased or decreased depending on desired accuracy of the system and on the resolution of the color correction processes carried out in the color correction unit 110.

Alternatively, the temperature estimation look-up table output values will often be expressed in units other than degrees centigrade as long as the output value of the temperature estimation unit 120 corresponds with the type of input which is expected by the color correction unit 110. Also, if the color correction unit 110 is designed to handle a temperature estimation input expressed in the form of a count value (I), then the output of the counter 126 can be sent directly to the color correction circuit and there would be no need for temperature estimation look-up tables.

It is noted that this preferred embodiment assumes an equilibrium temperature of 35° C. for the print head, but does not account for the ambient temperature in this determination. This is advantageous because it does not require measurement of the ambient temperature, or additional processing to account for the ambient temperature. Alternatively, ambient temperature may be measured and utilized in estimating the print head temperature. This can produce more accurate results over a range of different ambient operating conditions.

Also, instead of estimating print head temperature based on binary color values, the temperature could be estimated based on the nominal or corrected color values, in view of the fact that higher nominal or corrected color values will correlate with the firing of a greater number of droplets. As another alternative, temperature may be separately estimated for different portions of the print head. For example, there could be three separate temperature estimates respectively for the cyan, magenta and yellow nozzles.

Furthermore, a direct measurement of temperature of some portion of the print head can be made in order to estimate the effective print head temperature. Such a direct measurement of print head temperature can be referred to as an estimation of temperature because of possible errors in the measurement itself, and because the measured temperature may not correspond exactly with the effective temperature at each nozzle of the print head.

The temperature estimation look-up table, such as the one shown in FIG. 6 may be generated empirically, by directly measuring the print head temperature as a function of number of droplets fired for a given print head and printer design. This empirically determined function may then be used to generate a temperature correction look-up table for use in other printers which have a similar design.

Figure 7:
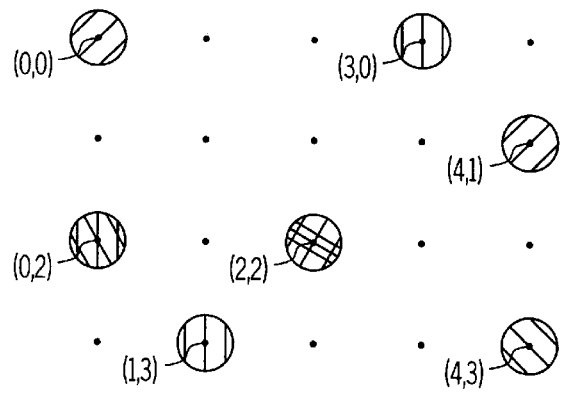
FIG. 7 is an enlarged view of color halftone output over a 5×4 pixel area.
Figure 8:
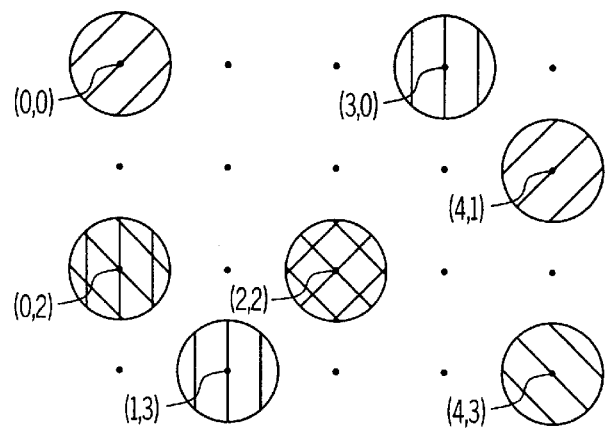
FIG. 8 is an enlarged view of color halftone output of a conventional ink jet printer operating at a relatively high temperature over a 5×4 pixel area.
Figure 9:
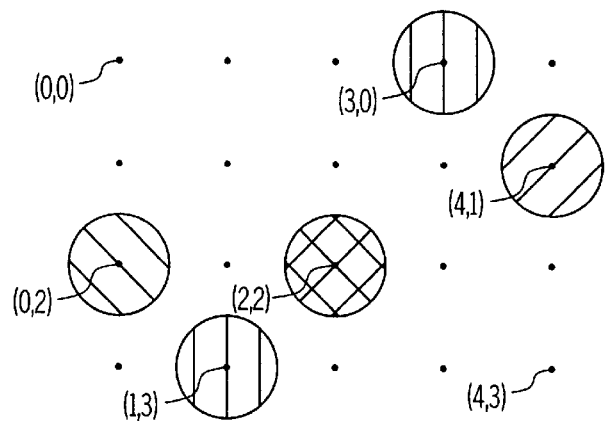
FIG. 9 is an enlarged view of color halftone output of an ink jet printer according to the present invention operating at a relatively high temperature over a 5×4 pixel area.

FIGS. 7 to 9 (not to scale) graphically illustrate the binary halftone temperature correction according to the present invention. FIG. 7 shows 5×4 pixel area {(0,0) to (5,4)} selectively printed with pixels of three colored inks by binary halftone printing. More specifically pixels (0,0), (2,2) and (4,1) are printed with cyan ink, pixels (3,0), (0,2) and (1,3) are printed with magenta ink, and pixels (0,2), (2,2) and (4,3) are printed with yellow ink. The pixels of FIG. 7 are printed with a print head temperature which is close to the nominal print head temperature assumed in assigning the color values of the image data. Therefore, FIG. 7 provides a good halftone representation of this portion of the image.

However, assume that print head temperature is high during the printing of this area, causing dot size to be larger. FIG. 8 shows how a conventional binary ink jet printer will print larger dots of the various colors at the same locations, thereby inaccurately rendering the halftone image. On the other hand, FIG. 9 shows how a binary ink jet printer according to the present invention corrects for the larger dot size by printing fewer (albeit larger) dots at high print head temperature.

The determination of corrected color values to be used in color correction look-up tables (see FIGS. 5a to 5c) will now be discussed. The corrected color values can be generated empirically by printing the various ink colors at various temperatures for a given print head design to observe the effect of temperature and determine the appropriate corrected color values.

Alternatively, the color correction tables could be mainly based on computer simulations, possibly supplemented with empirical verification and a bit of tweaking. Color simulation can be done by a number of numerical methods.

Figure 13:
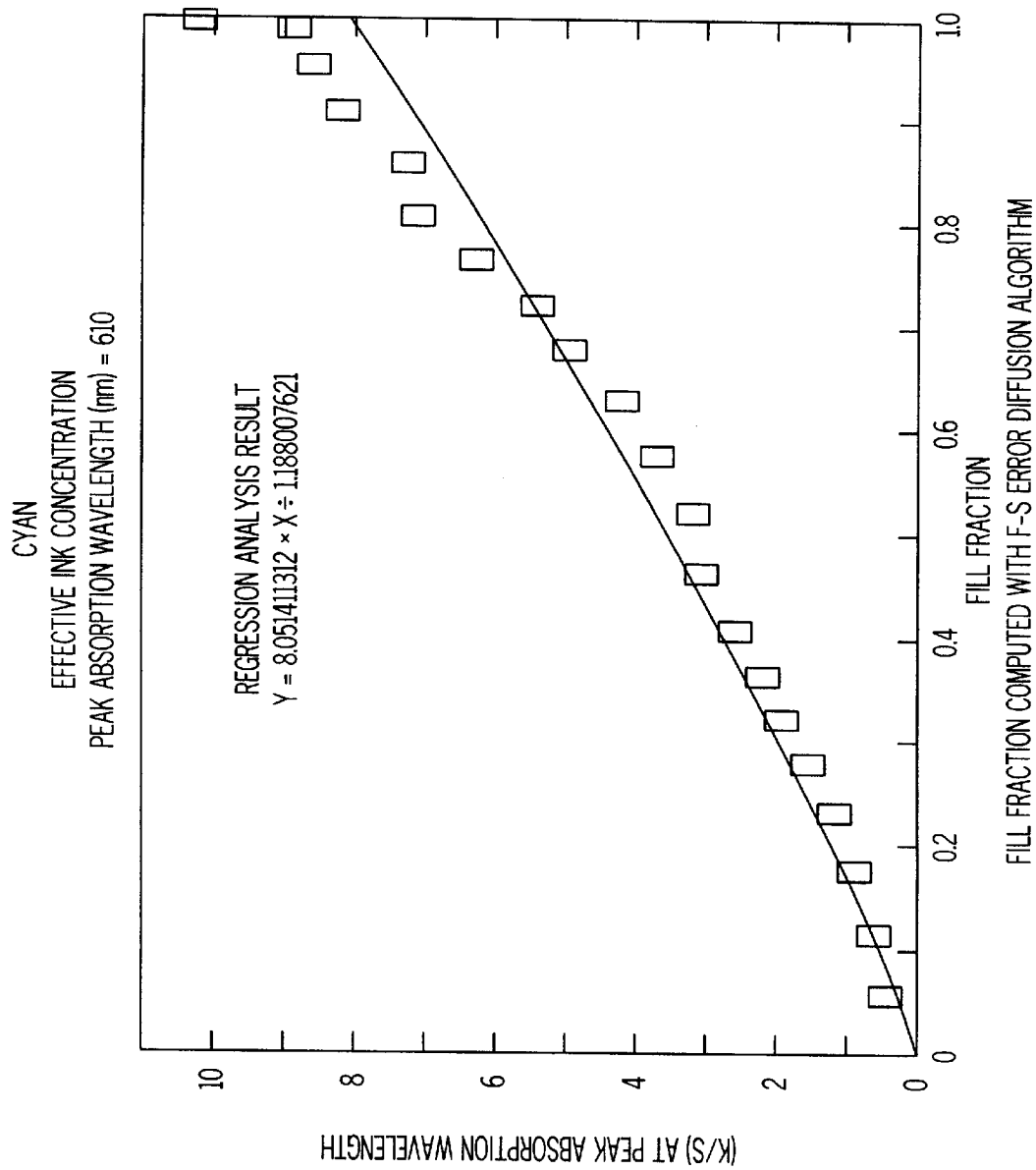
FIG. 13 is a graph showing peak absorption vs. fill fraction for cyan.
Figure 14:
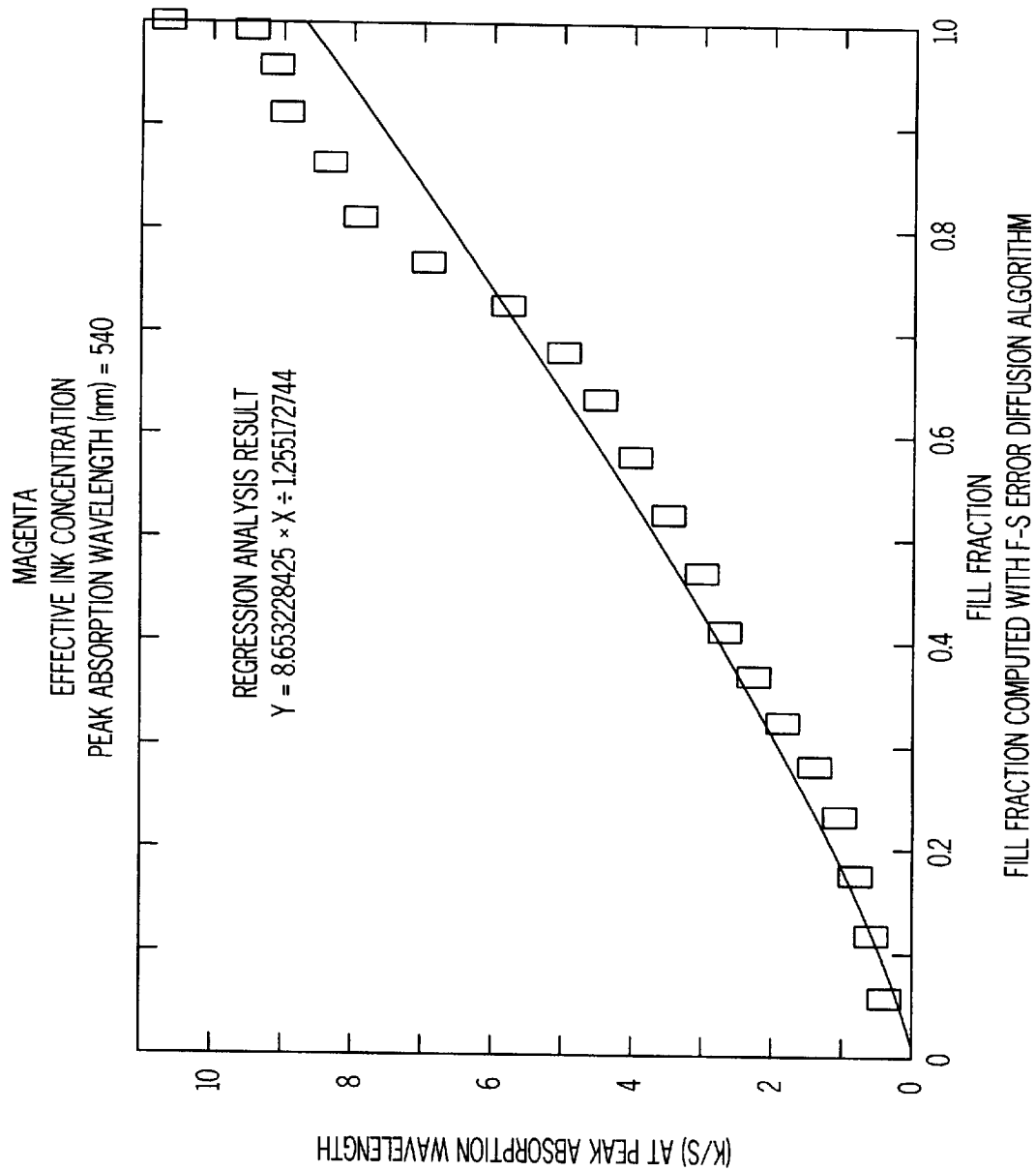
FIG. 14 is a graph showing peak absorption vs. fill fraction for magenta.
Figure 15:
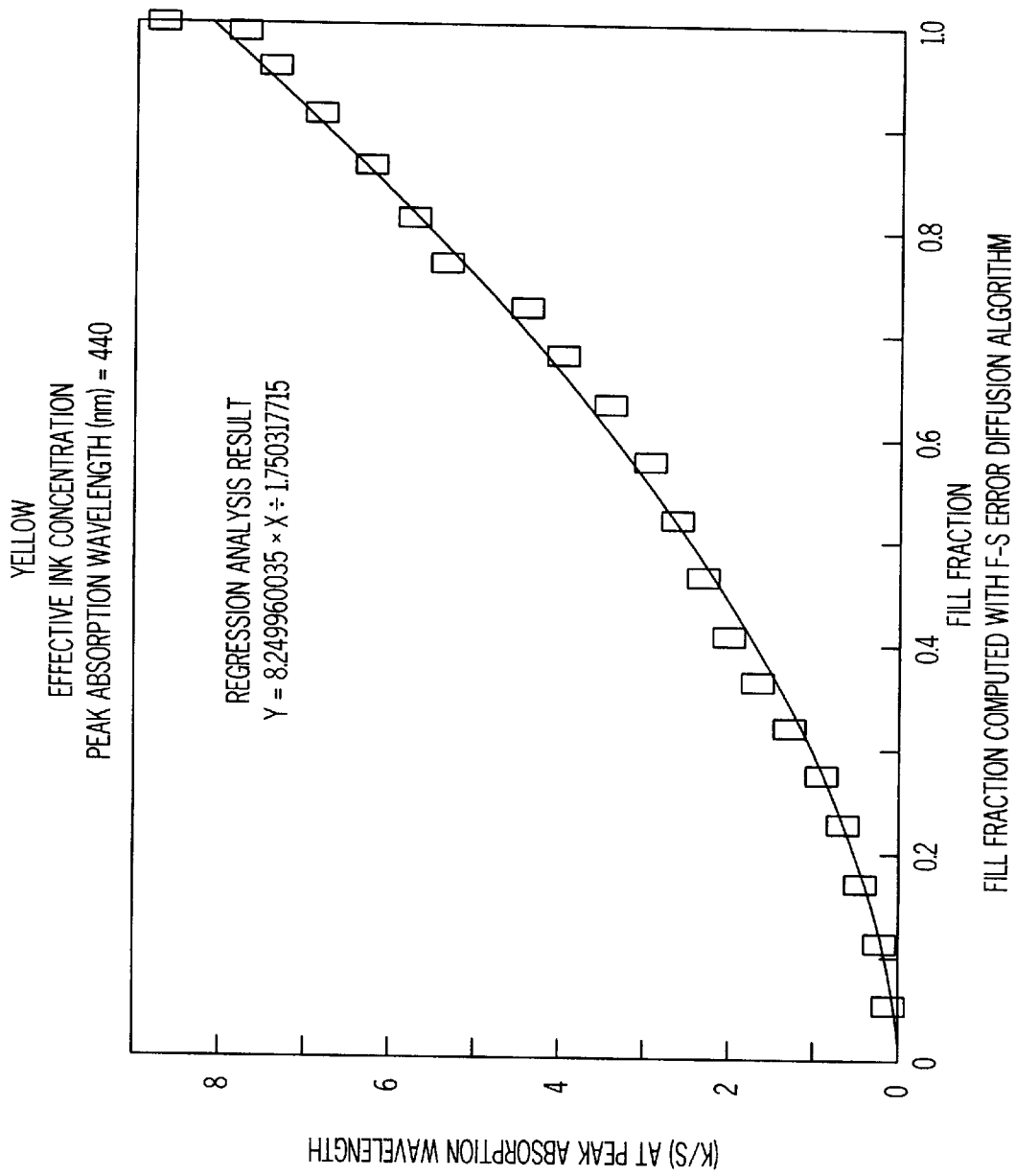
FIG. 15 is a graph showing peak absorption vs. fill fraction for yellow.
Figure 16:
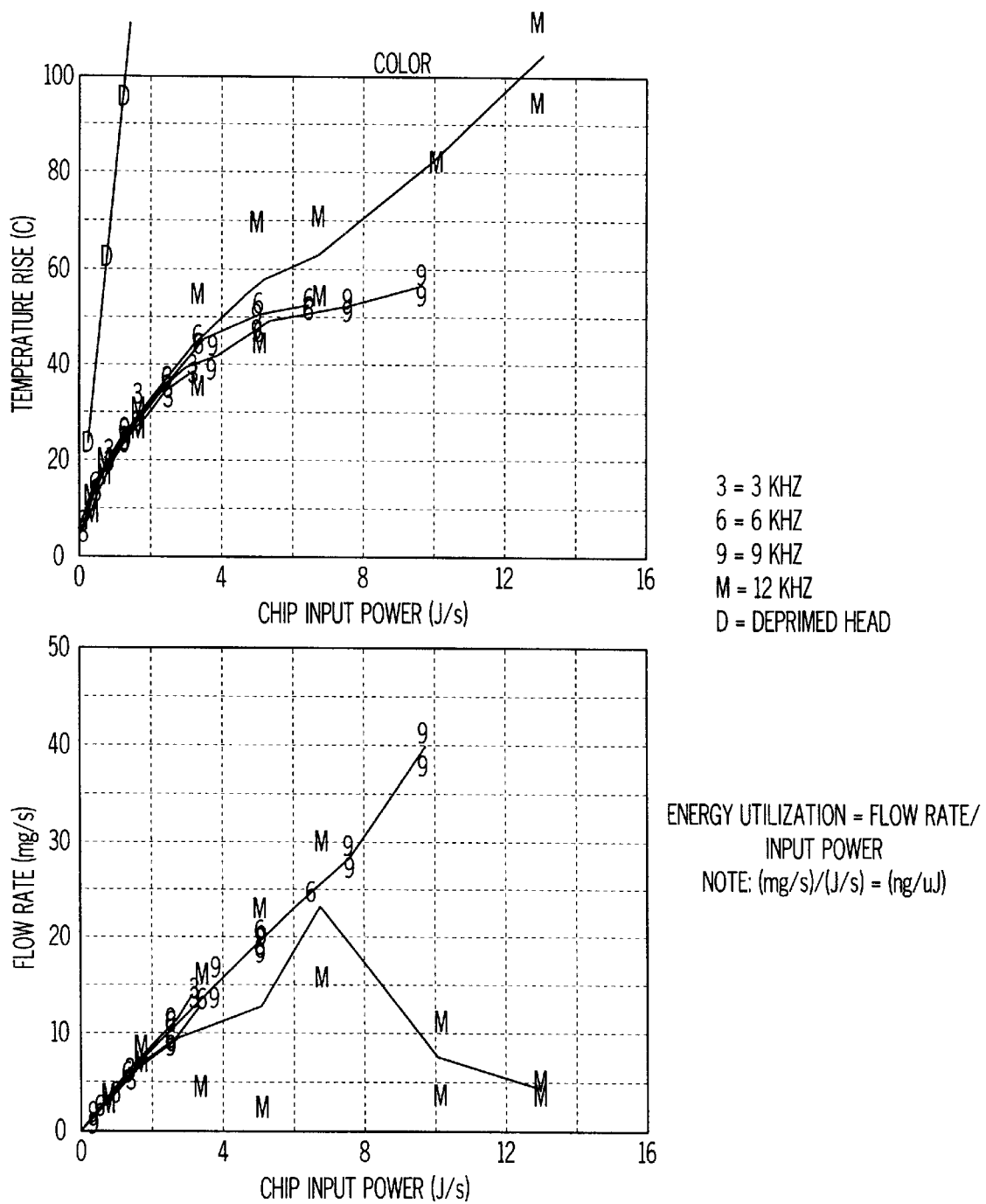
FIG. 16 is a graph showing temperature rise and flow rate vs. chip input power.
Figure 17:
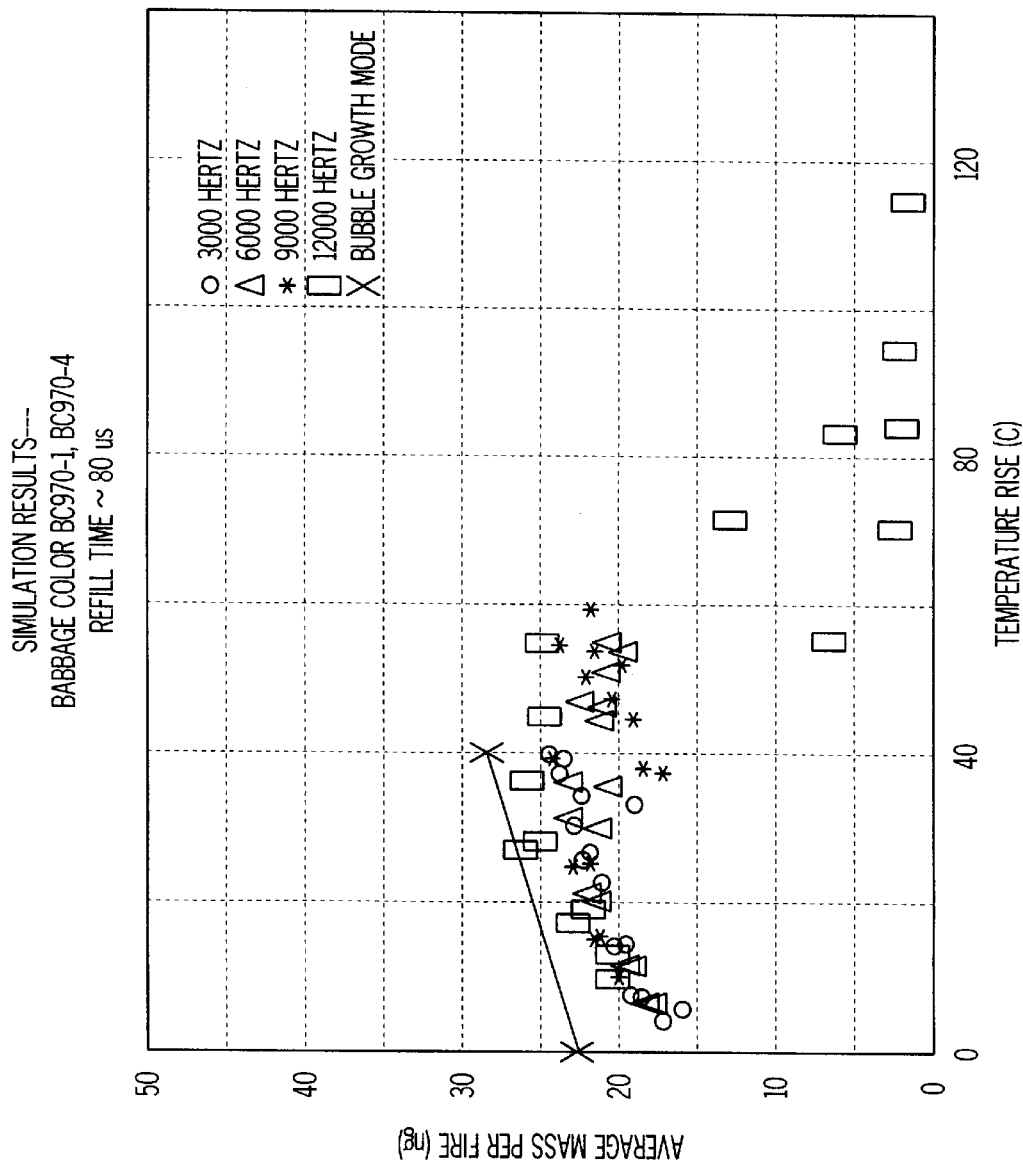
FIG. 17 is a graph showing average mass per fire vs. temperature rise simulation results.

One numerical method of color simulation applies the Kubelka-Munk mixing theory to a digital-error diffused ink jet application. The Kubelka-Munk (K-M) equations are robust equations conventionally used for color matching in opaque systems such as cases involving papers, dyes, plastics, paints and textiles. This numerical method of color simulation uses area coverage of each ink, instead of ink concentration. This has permitted a model to be developed where the inputs are:
1. Spectral characterization of the primary inks (see FIGS. 10–12);
2. Effective ink concentration factors as a function of area coverage (see FIGS. 13–15);
3. Area coverage algorithms for error diffusion patterns (computed);
4. Arbitrary CMY levels from 0 to 255;
5. Relationship between drop mass and spot size (e.g., spot diameter ($\mu$m)≈19×(drop mass)$^{0.44}$);
6. Relationship between input power and temperature rise (see FIG. 16);
7. Relationship between temperature and drop mass (see FIG. 17); and
8. The expected drop mass range due to random manufacturing variations.

For any combination of CMY (L), where (0<L<255), the model outputs are:
1. Spectral reflectance of the halftone color for a nominal drop size;
2. L*a*b* coordinates for this halftone color and droplet size;
3. Spectral reflectance of the halftone colors over the probable drop mass range; and
4. L*a*b* coordinates for the probable drop mass range.

Figure 18:
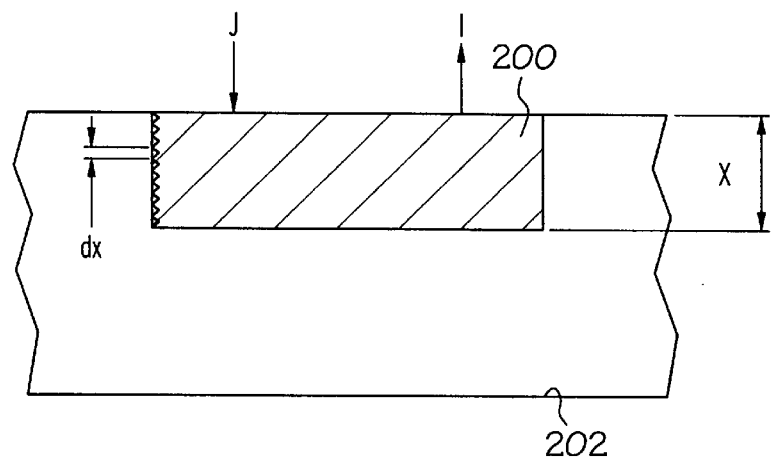
FIG. 18 is a diagram showing light reflection from a colorant layer.

Referring to FIG. 18, a colorant layer 200 sits on a backing surface (paper) 202 with incident light I and reflected light J. The colorant layer has a thickness X, a light absorption coefficient K and a light scattering coefficient S. Assuming the colorant layer diffuses light flux in all directions, the light flux that diffuses left and right in the layer cancels out. The remaining light flux J moves up through the layer. As light flux I and J move through a thin slice of the colorant dx, their magnitudes are decreased. According to the theory of Kubelka and Munk, the following differential equations describe what happens to light flux as it passes through the colorant layer.

$$dj=-(S+K)jdx+Sidx \quad (1)$$

$$-di=-(S+K)idx+Sjdx \quad (2)$$

Their solution to these equations is:

$$R = \frac{1 - Rg(a - b \coth bsx)}{a + (b \coth bSX) - Rg} \quad (3)$$

Where:

$$J=R \times I \quad (4)$$

$$a=1+(K/S) \quad (5)$$

$$b=(a^2-1)^{0.5} \quad (6)$$

$J=(j)_{x=0}$=intensity of light reflected by the colorant $I=(i)_{x=0}$=intensity of light incident on the top surface of the colorant K=absorption coefficient S=scattering coefficient X=thickness of the colorant layer The solution of this equation set for ink jet printing would pose a difficult problem indeed because the colorant layer is not sharply defined—it's not like a coat of paint on a metal plate. Measurement of the thickness X would cause ambiguous results. This difficulty can be avoided if it is assumed the materials are optically thick. For the case of optically thick materials, the above equations reduce to the well known single constant K-M equation:

$$R_\infty = 1 + (K/S) - \sqrt{(K/S)^2 + 2(K/S)} \quad (7)$$

$$(K/S) = (1 - R_\infty)^2 / (2R_\infty) \quad (8)$$

Where:

$R_\infty$=reflectance of a colorant layer so thick that further additions do not change the result.

Because the K-M equation has been used with success in other contexts, it might be appropriate for the color simulations for color tables according to the present invention. The model verification results shown later help to confirm the suitability of the single constant K-M equation for the digital printing—error diffusion applications.

Now the halftone mixing equation will be further explained. For each primary ink it is required to generate a unit (K/S) curve. This way, various concentrations (area fills) of the primaries can be simulated by multiplying the unit (K/S) curves by the corresponding ink concentration factors. When several inks (or paints, or pigments) are mixed together, the (K/S) of the mixture is the sum of the component parts. The equation below shows the general form.

$$(K/S)_{mix}=c_1(K/S)_1+c_2(K/S)_2+ \ldots c_n(K/S)_n \quad (9)$$

Where:

$c_n$=concentration of ink n $(K/S)_n$=absorption/scattering coefficient of ink n In the digital printing application, we are not mixing various paints together to achieve a solid color tint, instead we are applying various numbers of dots to the paper to achieve specific halftone colors. Since the chemical concentration is fixed for each of the primary inks, area fill is used to determine the effective ink concentrations for us in the K-M mixing equation. The general mixing equation is modified to account for this, as shown below. It is noted that in this paper the sample calculations are based on a three ink system, such as the Lexmark 7000 (TM) system. However, there is no reason to limit the application to single dilution inks. Many modern ink jet printers offer six color printing—that is, a full strength cyan, magenta, yellow print head, and a companion head with diluted cyan, magenta and yellow. Both single strength and diluted inks are covered by the following halftone mixing equation:

$$(K/S)_{halftone} = (K/S)_{paper} + \quad (10)$$
$$\sum_{n=1}^{N} \{[A_{Cn}C_{Cn}\text{Unit}(K/S)_{Cn}] + [A_{Mn}C_{Mn}\text{Unit}(K/S)_{Mn}] +$$
$$[A_{Yn}C_{Yn}\text{Unit}(K/S)_{Yn}]\}$$

Where:

N=number of ink dilutions per primary color (N>0)

(N=1 for the Lexmark 7000)

(N=2 for the photo option of the Lexmark 5700)

$A_{Cn}$=fractional fill of cyan dilution n; $C_{Cn}$=effective concentration of cyan dilution n $A_{Mn}$=fractional fill of magenta dilution n; $C_{Mn}$=effective concentration of magenta dilution n $A_{Yn}$=fractional fill of yellow dilution n; $C_{Yn}$=effective concentration of yellow dilution n Area fill and error diffusion will now be discussed. The halftone mixing equation contains area fill terms for each primary. Determining area fill for an error diffused halftone pattern from digital level 0 to digital level 255 is not difficult, but if only we could make square spots that were exactly one pel wide and one pel high, the mathematics would be so easy. Unfortunately this is not the case, but thanks to Descartes and Fermat we have analytical geometry. Using these techniques, it is a simple matter to account for the various overlap conditions that occur in an error diffused print pattern.

Figure 19:
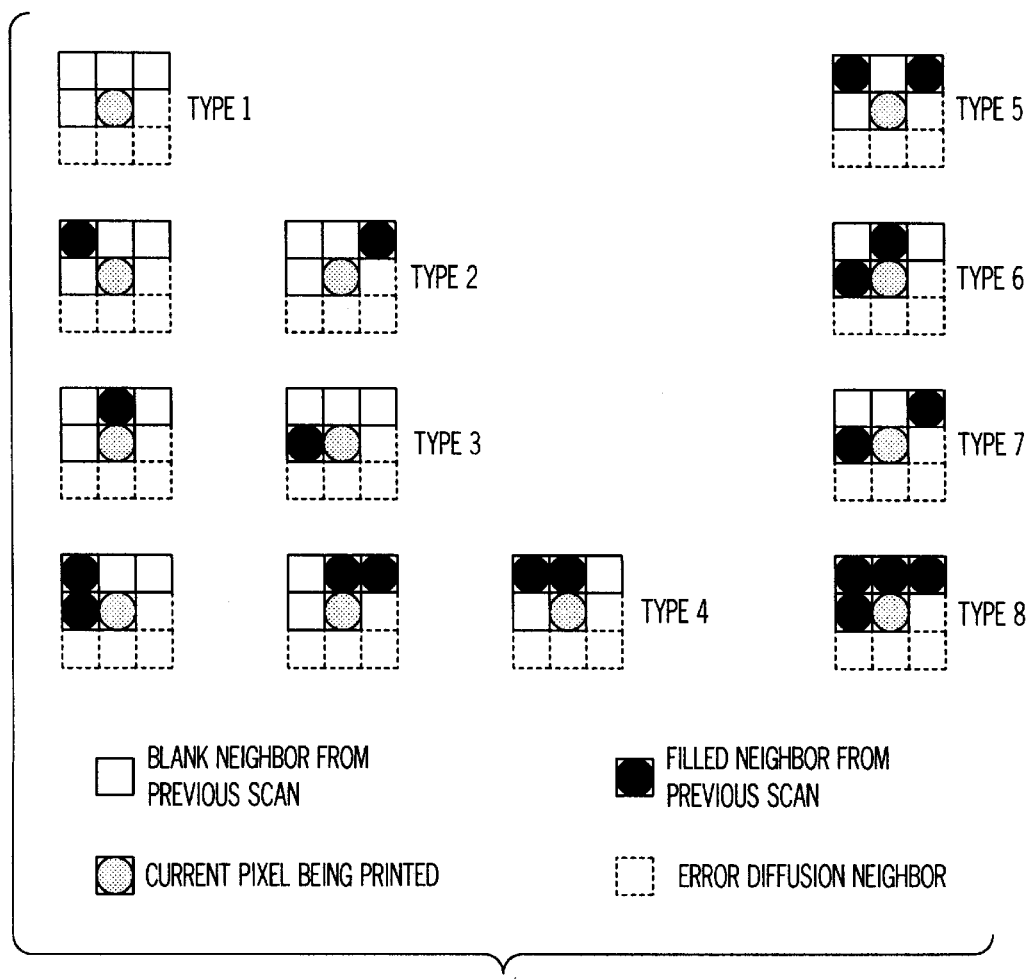
FIG. 19 is diagram showing various error diffusion pixel types.

The details of error diffusion, masking matrices, and the like are explained in detail in the literature, so this subject will not be discussed here. Suffice it to say, the digital color printing model here disclosed uses a Floyd-Steinberg error diffusion algorithm (F-S). For each digital level, the model creates a large square matrix of ones and zeroes using F-S. Since the actual printed spots are not square, the bit map pixels are then sorted into eight types. The eight types correspond to the local overlap conditions for that individual pixel, as shown in FIG. 19 (showing error diffusion pixel types used to compute fill fractions from 0–255). Each pixel type has a set of equations that can be solved to determine its non-overlapping area as a function of the ratio:

$$F=\text{spot diameter/pel size} \quad (11)$$

When the model is simulating a particular halftone color, the first thing it does is compute a table that contains the fractional area fills for digital levels 0 through 255 for the specified F value.

Figure 10:
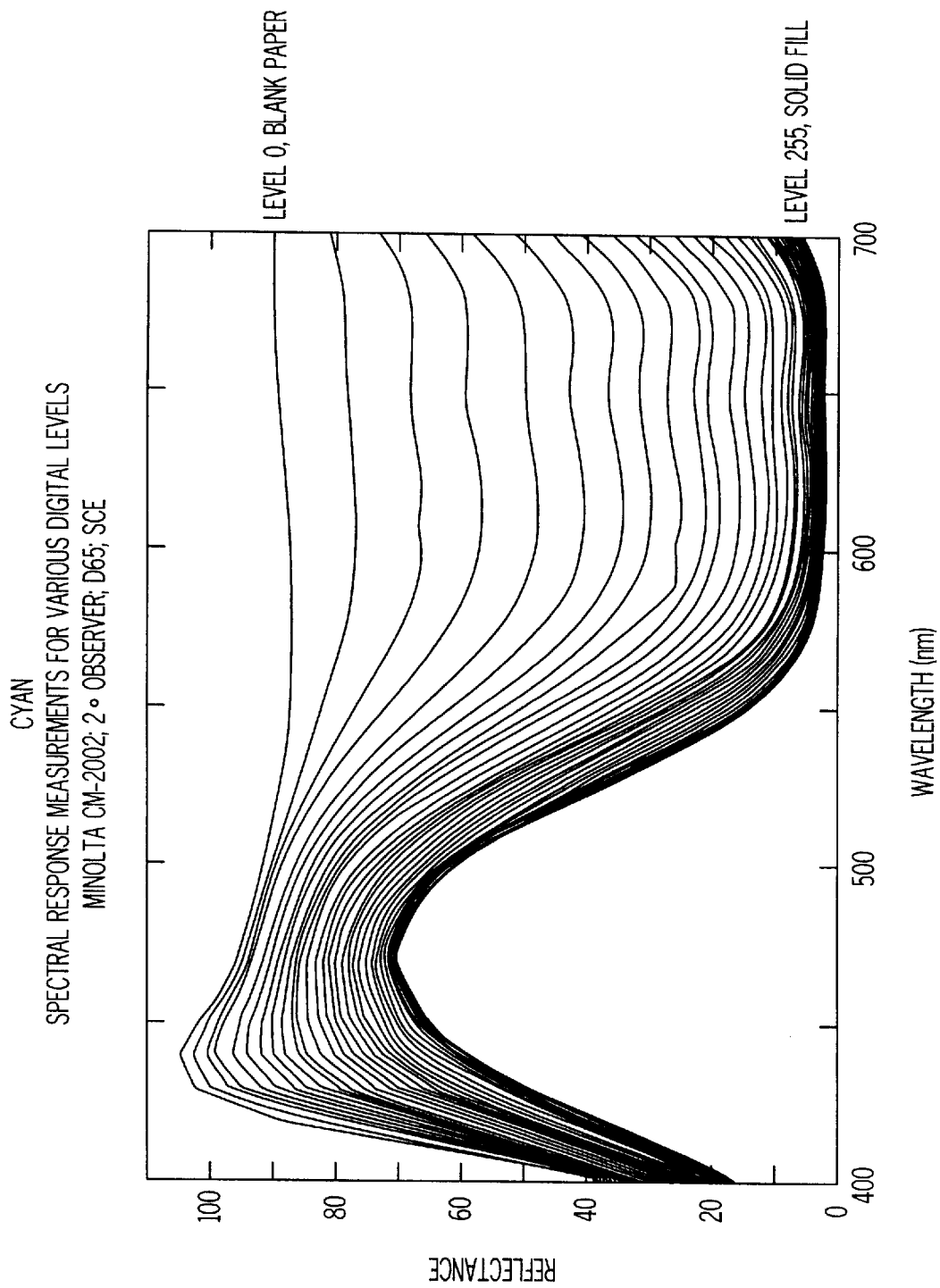
FIG. 10 is a graph showing reflectance vs. wavelength for cyan.
Figure 11:
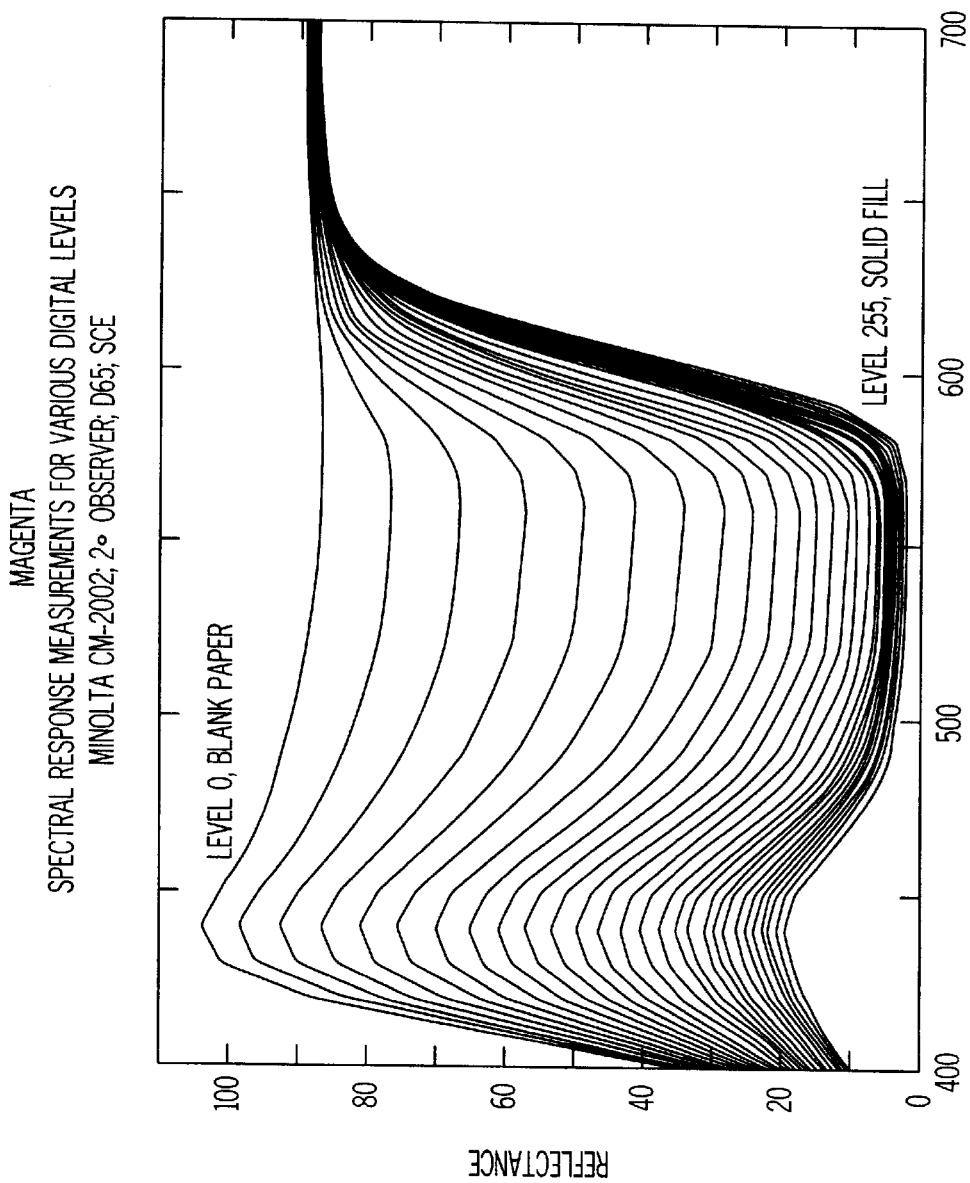
FIG. 11 is a graph showing reflectance vs. wavelength for magenta.
Figure 12:
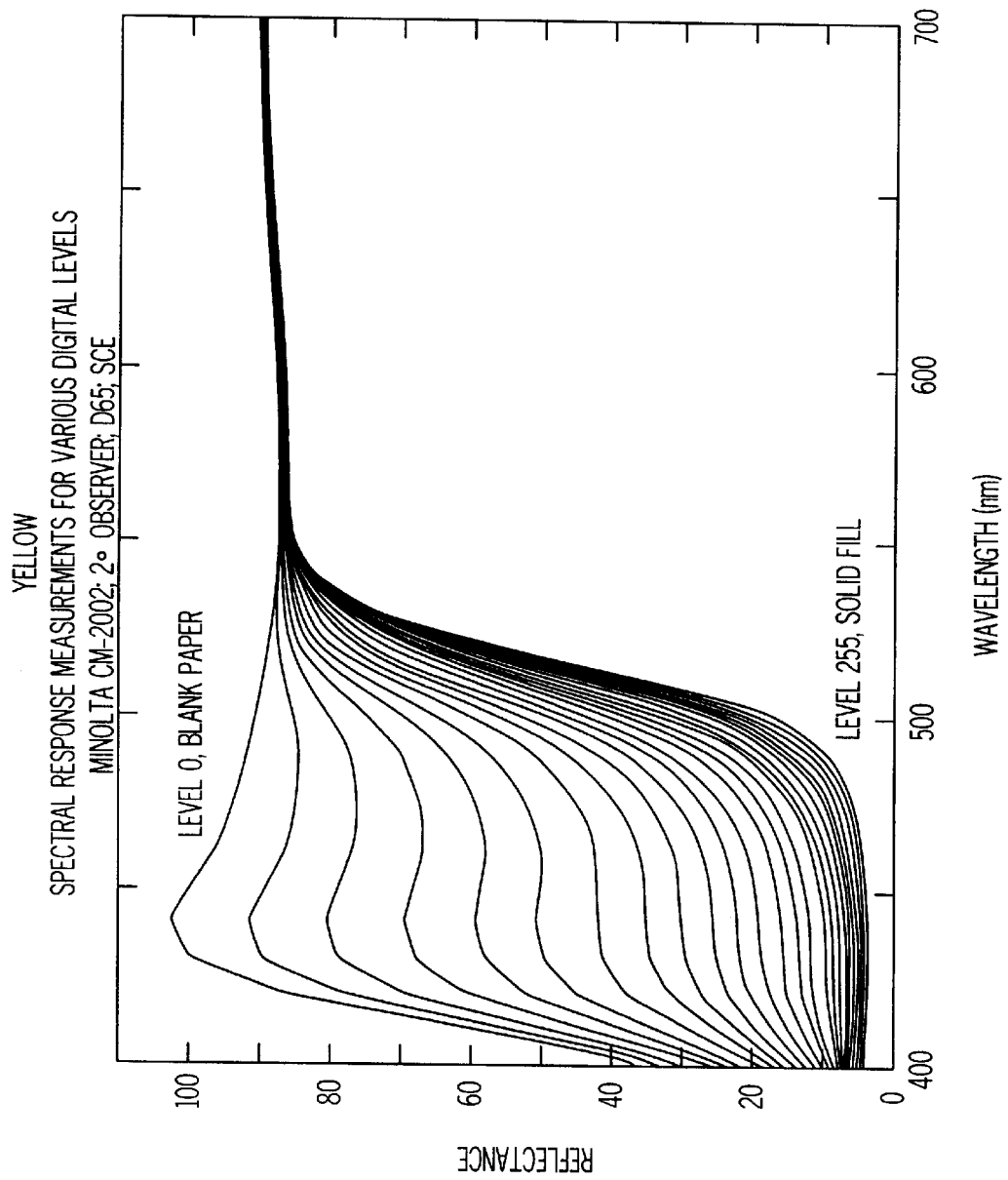
FIG. 12 is a graph showing reflectance vs. wavelength for yellow.

(K/S) transformations will now be discussed. The (K/S) values for the primaries are determined from experimentally measured CMY tint ladders. These transformations, done once, can then be used to simulate any desired digital combination of primary inks, for any given spot size. FIGS. 10–12 show the CMY tint ladders of the Lexmark 7000. The (K/S) values for these primaries were obtained with the single constant K-M equation as shown below.

$$(K/S)_1 = (1-R_\lambda)^2/2R_\lambda \quad (12)$$

Where $R_\lambda$=measured spectral reflectance of the tint ladder (400 nm<$\lambda$<700 nm)

Figure 23A:
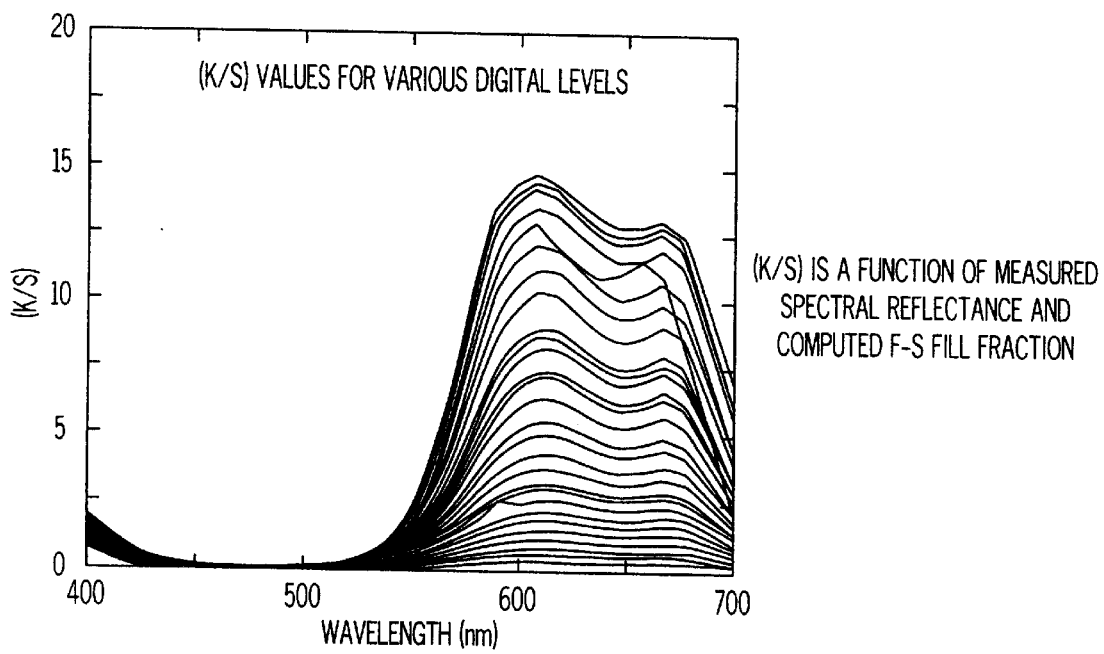
FIGS. 23a and 23b are graphs showing a digital color mixing model for cyan.
Figure 24A:
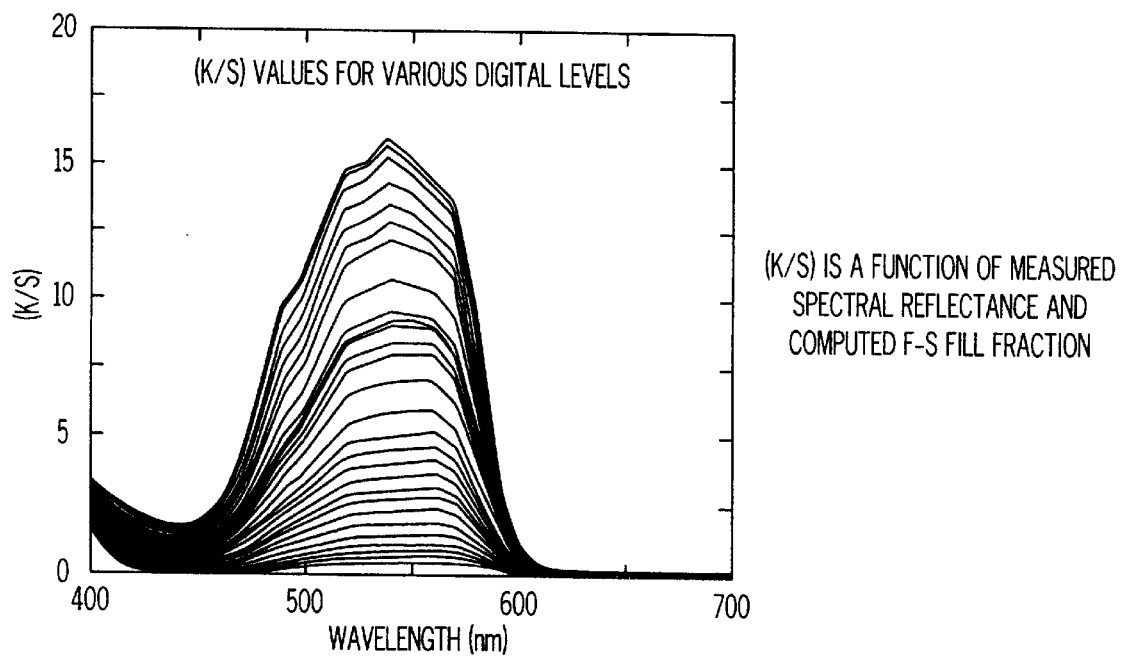
FIGS. 24a and 24b are graphs showing a digital color mixing model for magenta.
Figure 25A:
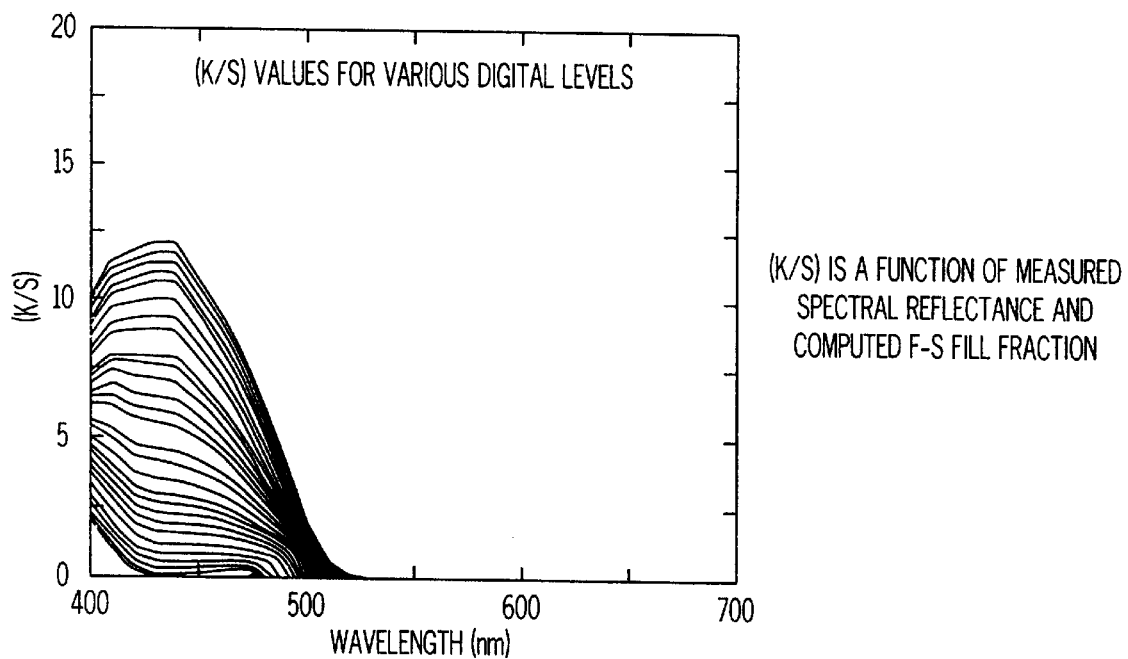
FIGS. 25a and 25b are graphs showing a digital color mixing model for yellow.

This transformation of the spectral reflectance curves into (K/S) units is shown in FIGS. 23a, 24a, and 25a. The transformation of the blank paper spectral data into (K/S) units is preformed using equation (12) as well. In this model and in the measured tint ladders, digital level 0 is blank paper.

The next transformation subtracts out the effect of the white paper and accounts for the area fills. The paper effects are removed in this step because it is necessary to isolate the effects of the primary inks from the media. The paper will be accounted for later. Also, since area fill will be used later when computing the effective concentration of the primaries, it is factored out here, too. This results in a second transformation on the CMY tint ladder spectral data, using the formula shown below.

$$(K/S)_2 = [(K/S)_1 - (K/S)_{paper}]/\text{Fractional Area Fill} \quad (13)$$

Fractional area fill of the error diffused print pattern is computed using the analytical geometry approach discussed in the last section.

One final transformation must be made before the tint ladder data is in a form suitable for the halftone mixing equation (10). Unit (K/S) curves for each primary must be computed. This step simply involves normalizing the $(K/S)_2$ curve of the 100% fill pattern (digital level 255) for each of the primaries, using the following equation.

$$\text{Unit}(K/S) = \frac{(K/S)_2 \text{ solid fill}}{(K/S)_2 \text{ at the peak absorption wavelength}}$$

Figure 23B:
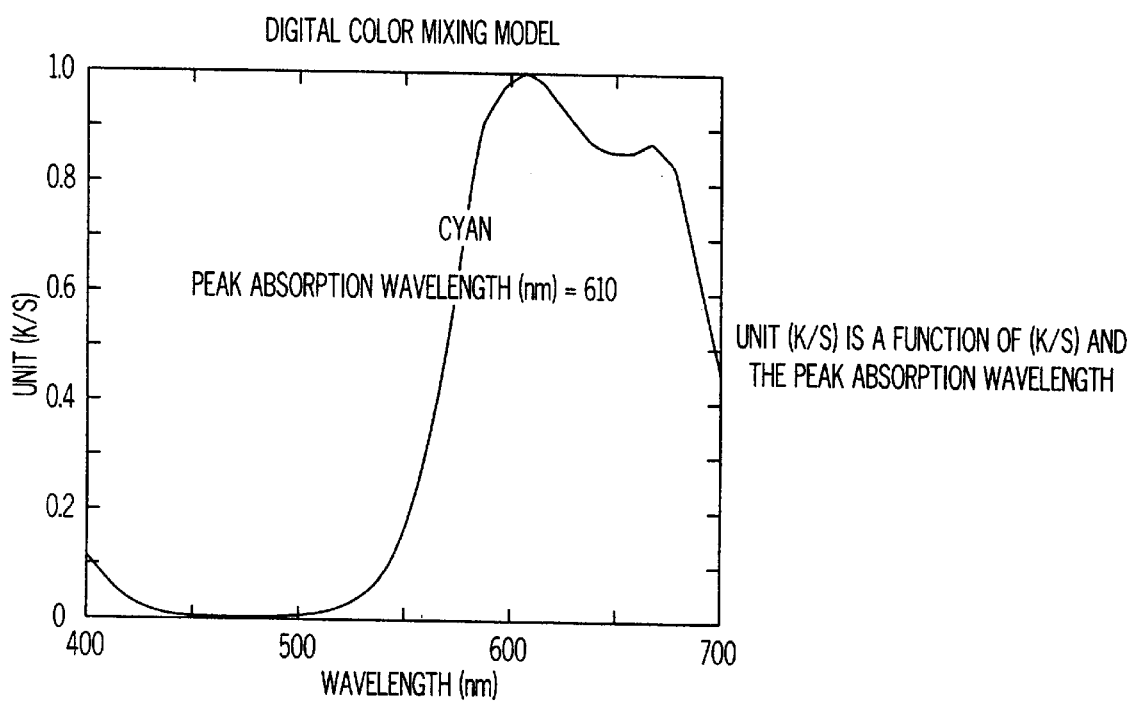
Figure 24B:
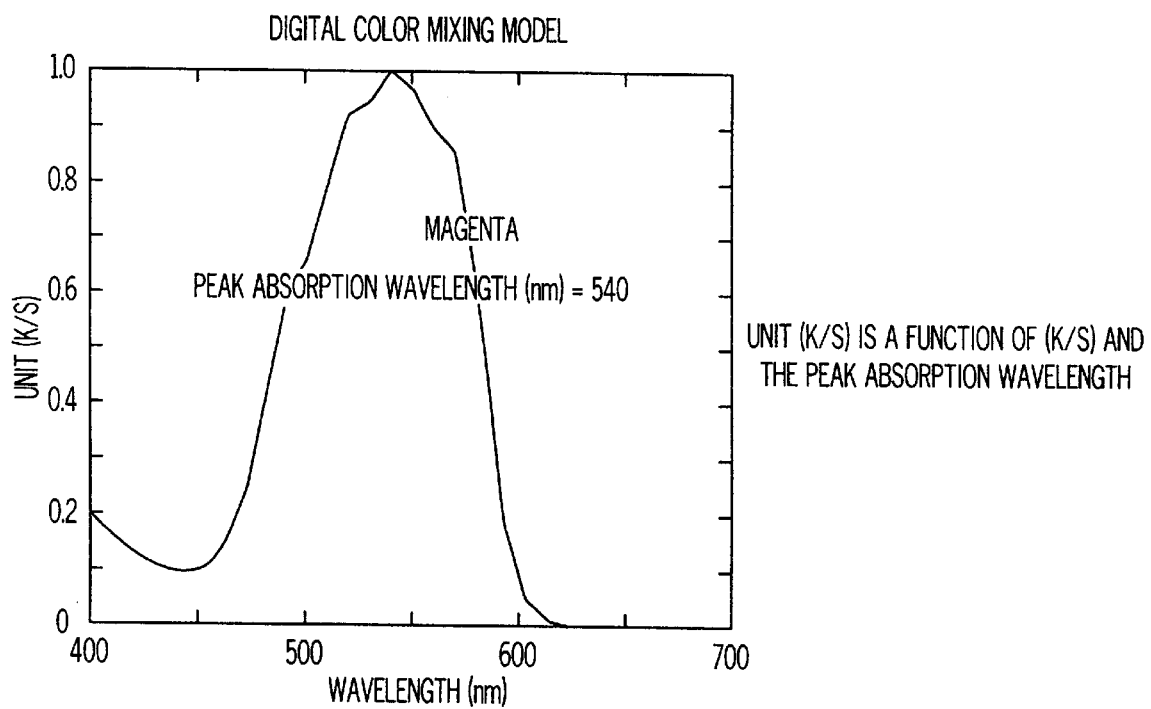
Figure 25B:
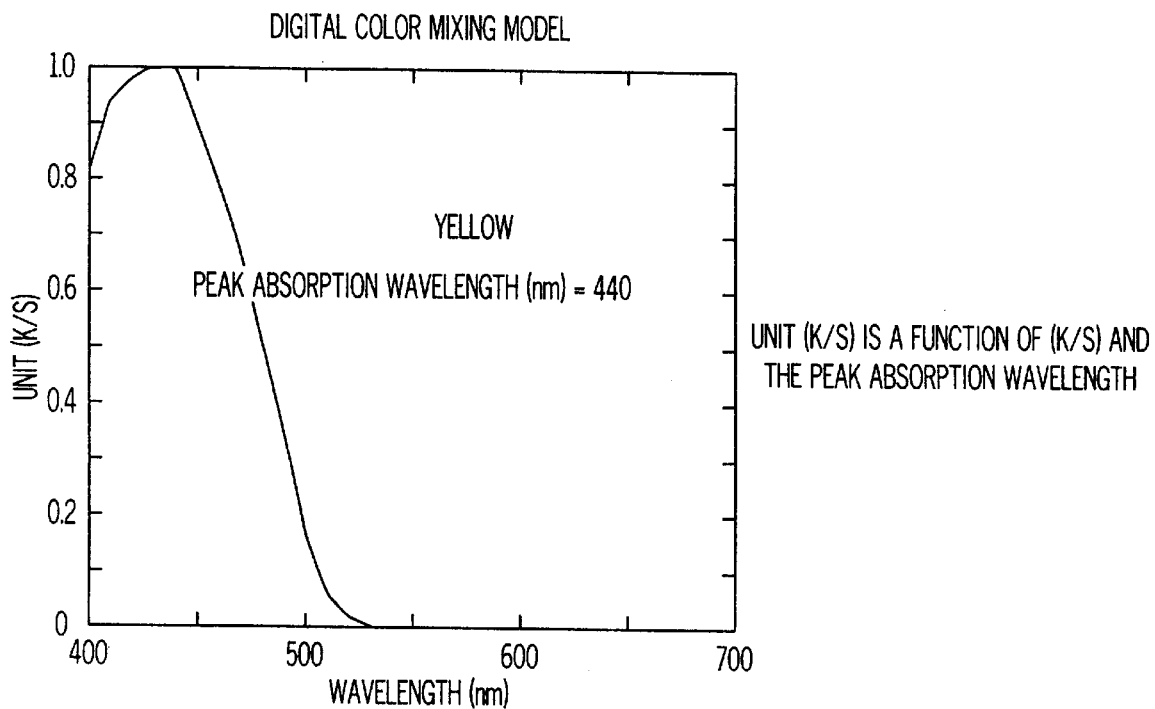
Figure 26:
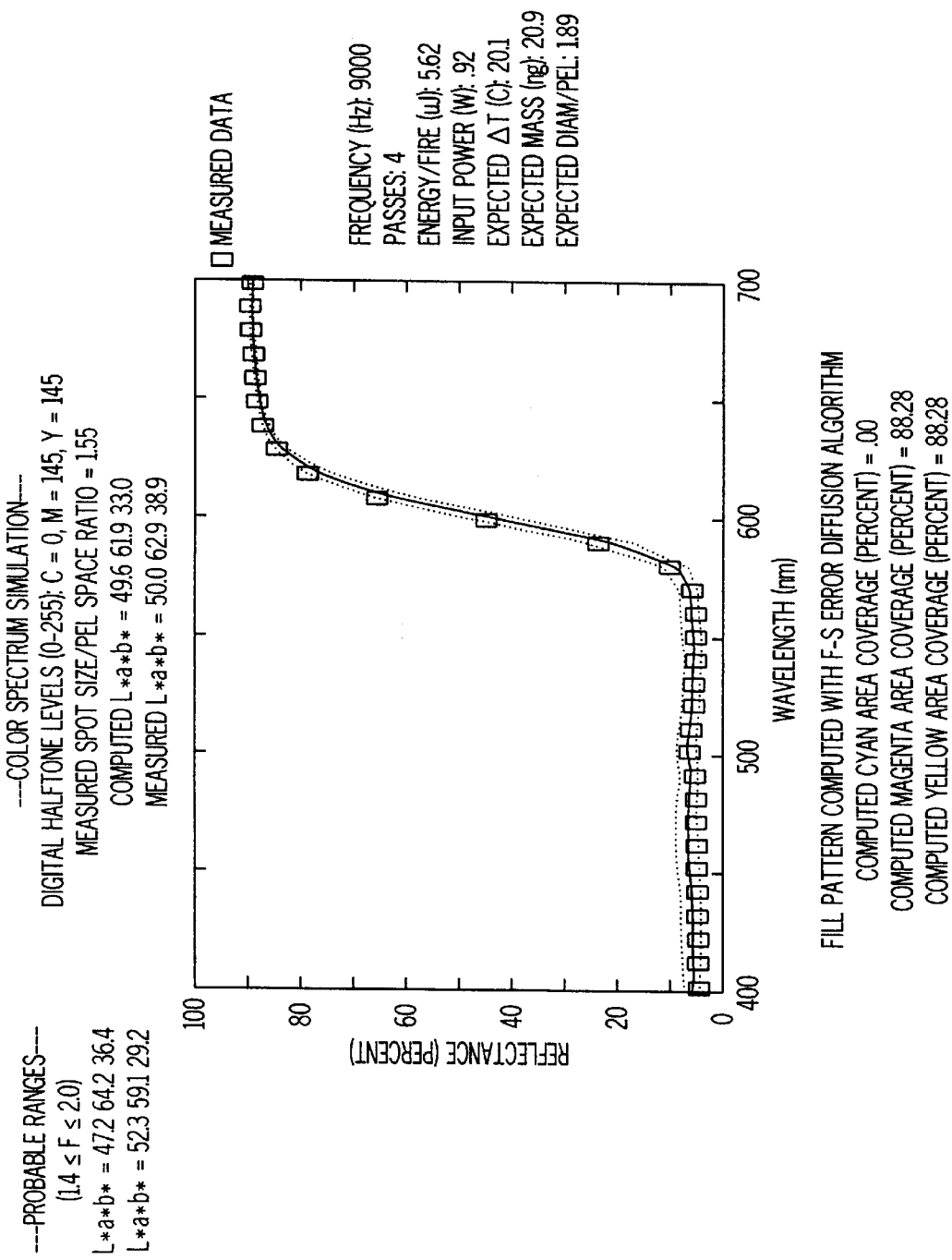
FIGS. 26 to 34 are graphs showing a color simulation spectrum as reflectance vs. wavelength.
Figure 27:
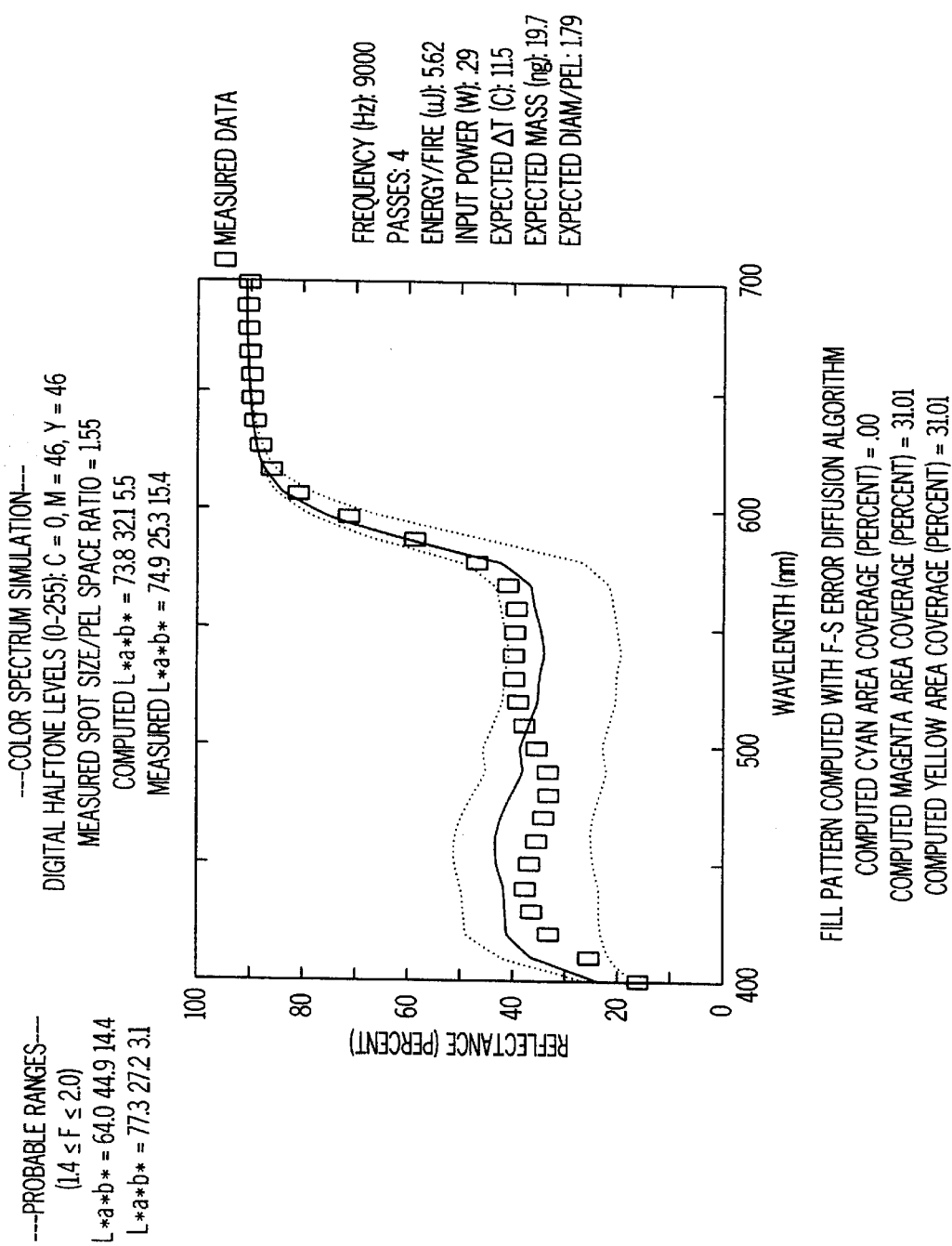
Figure 28:
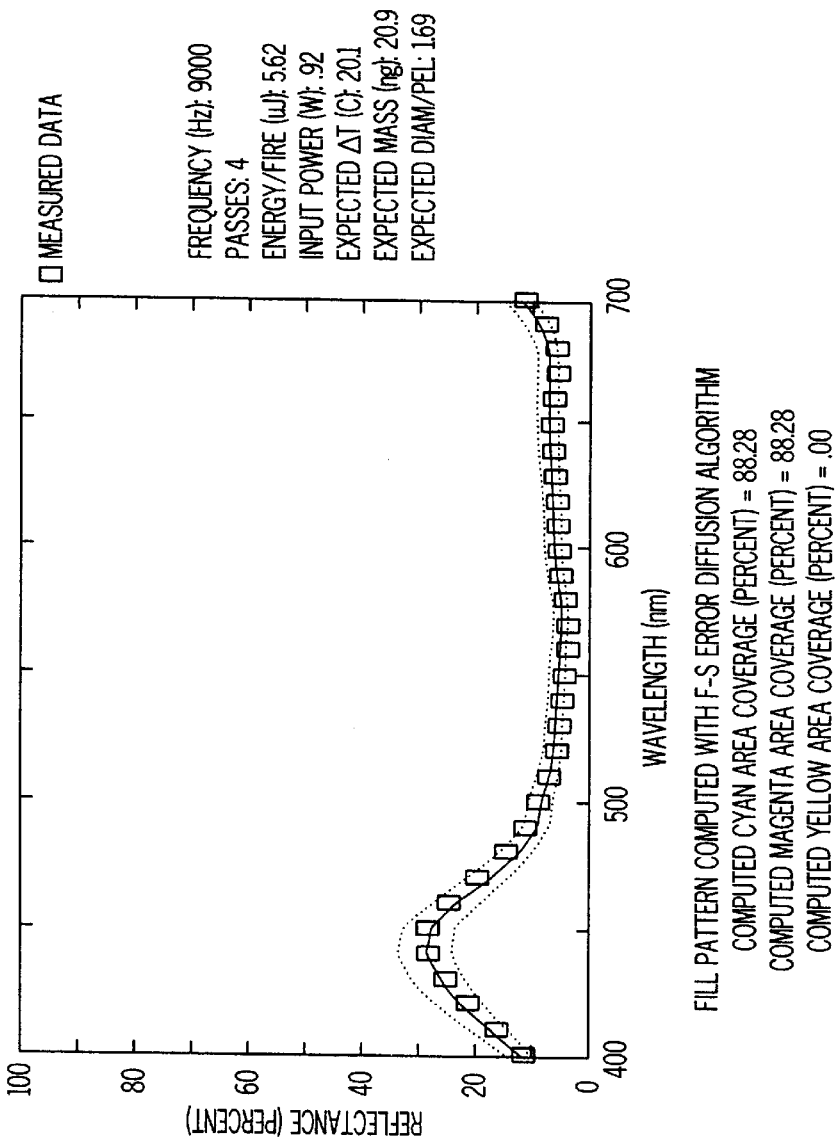
Figure 29:
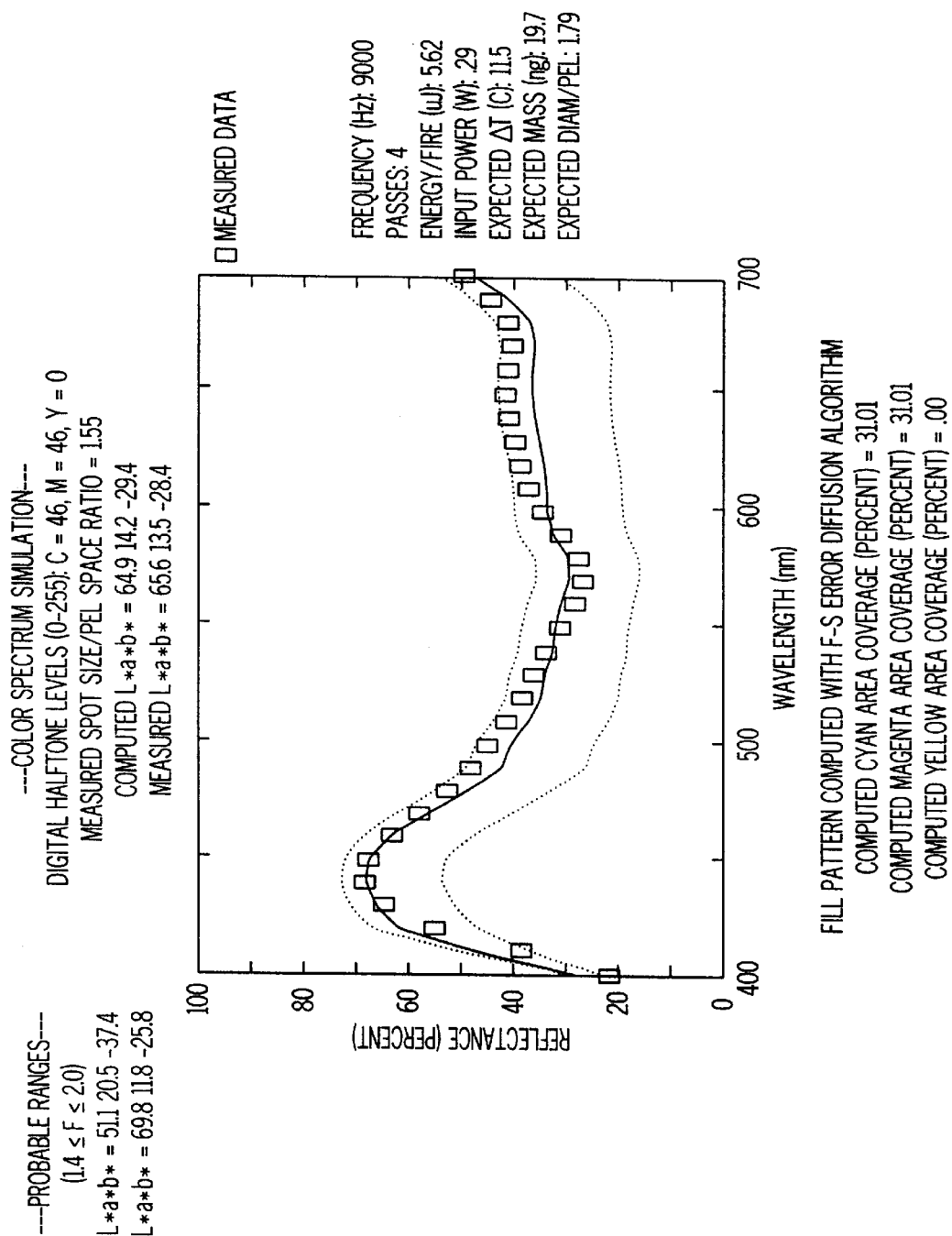
Figure 30:
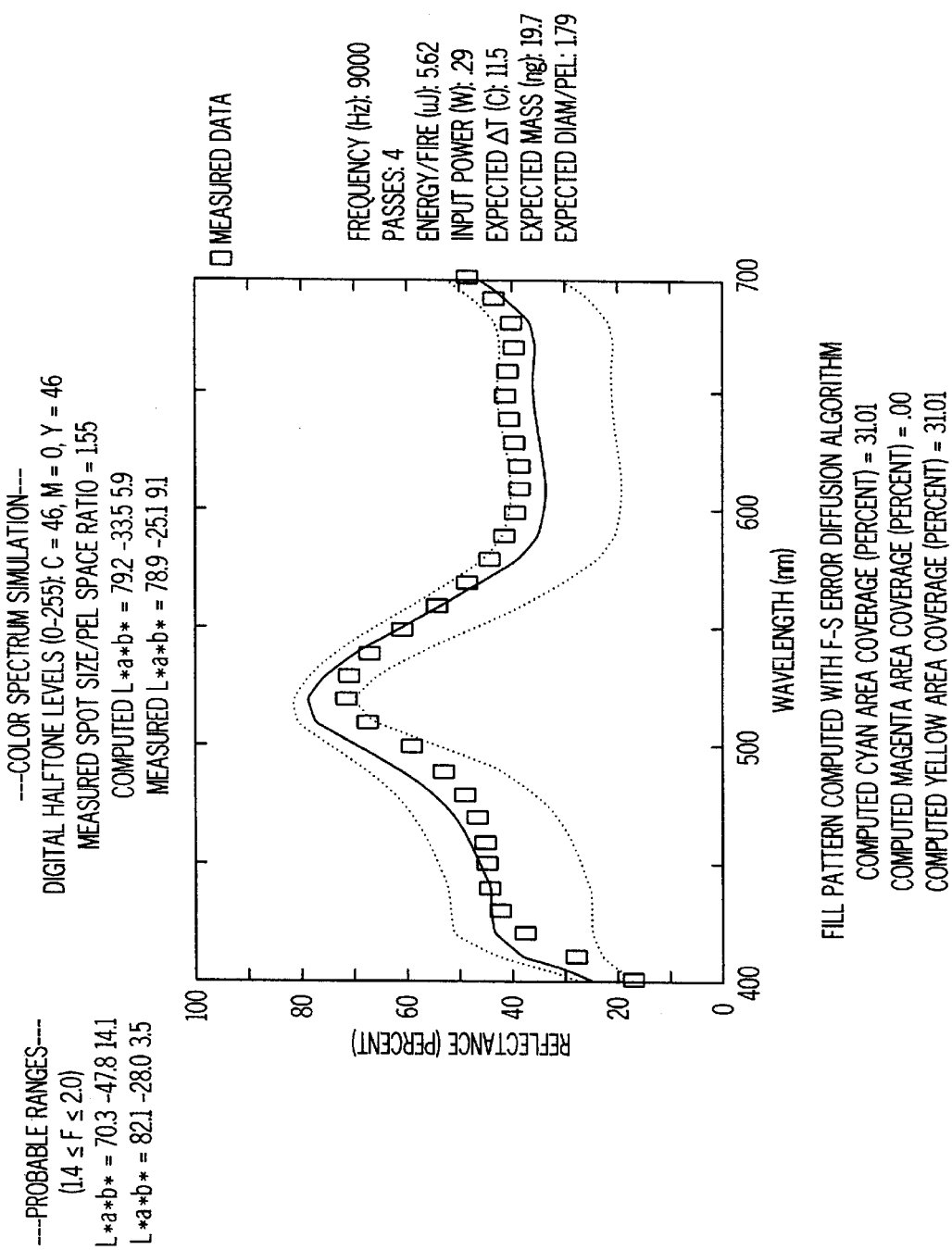
Figure 31:
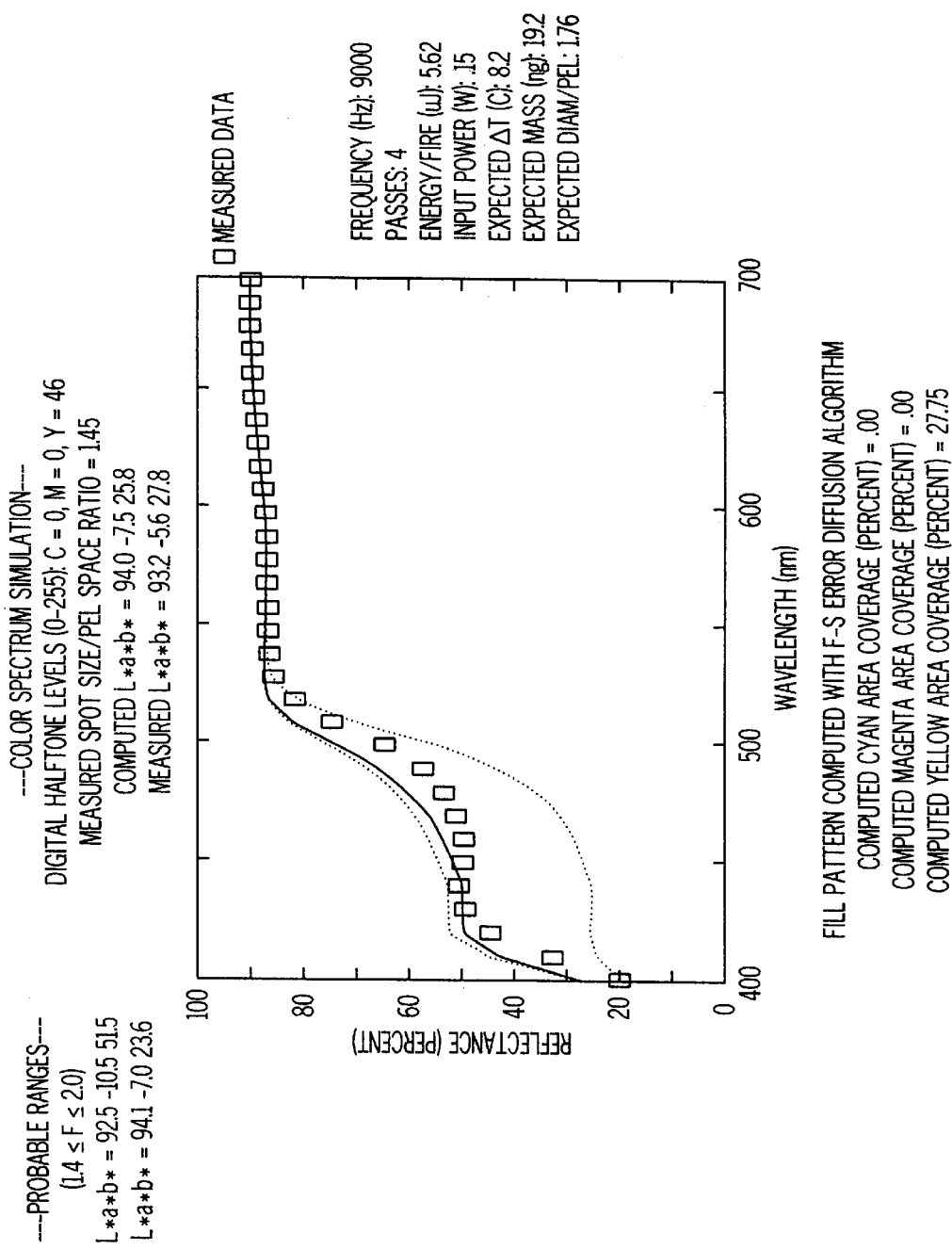
Figure 32:
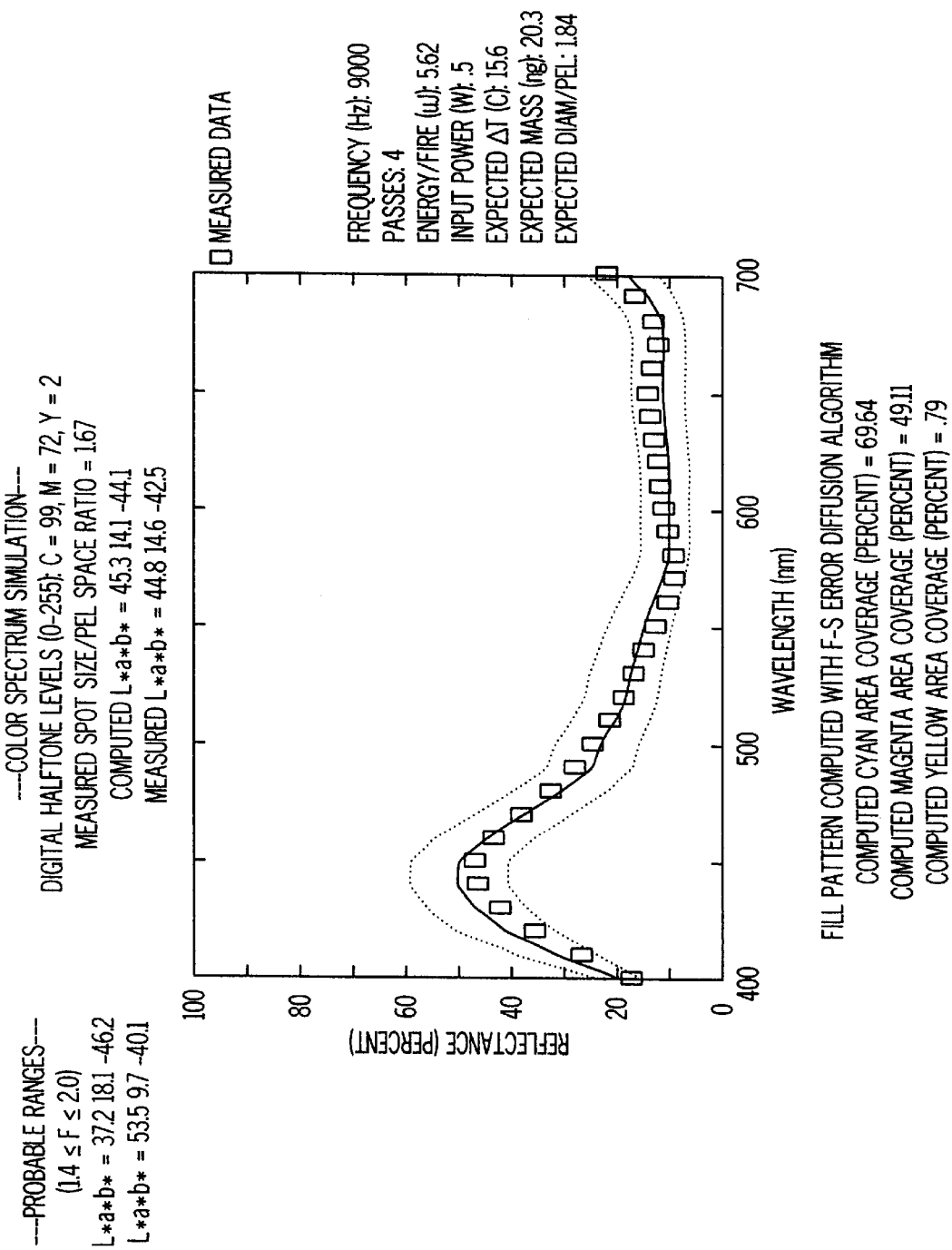
Figure 33:
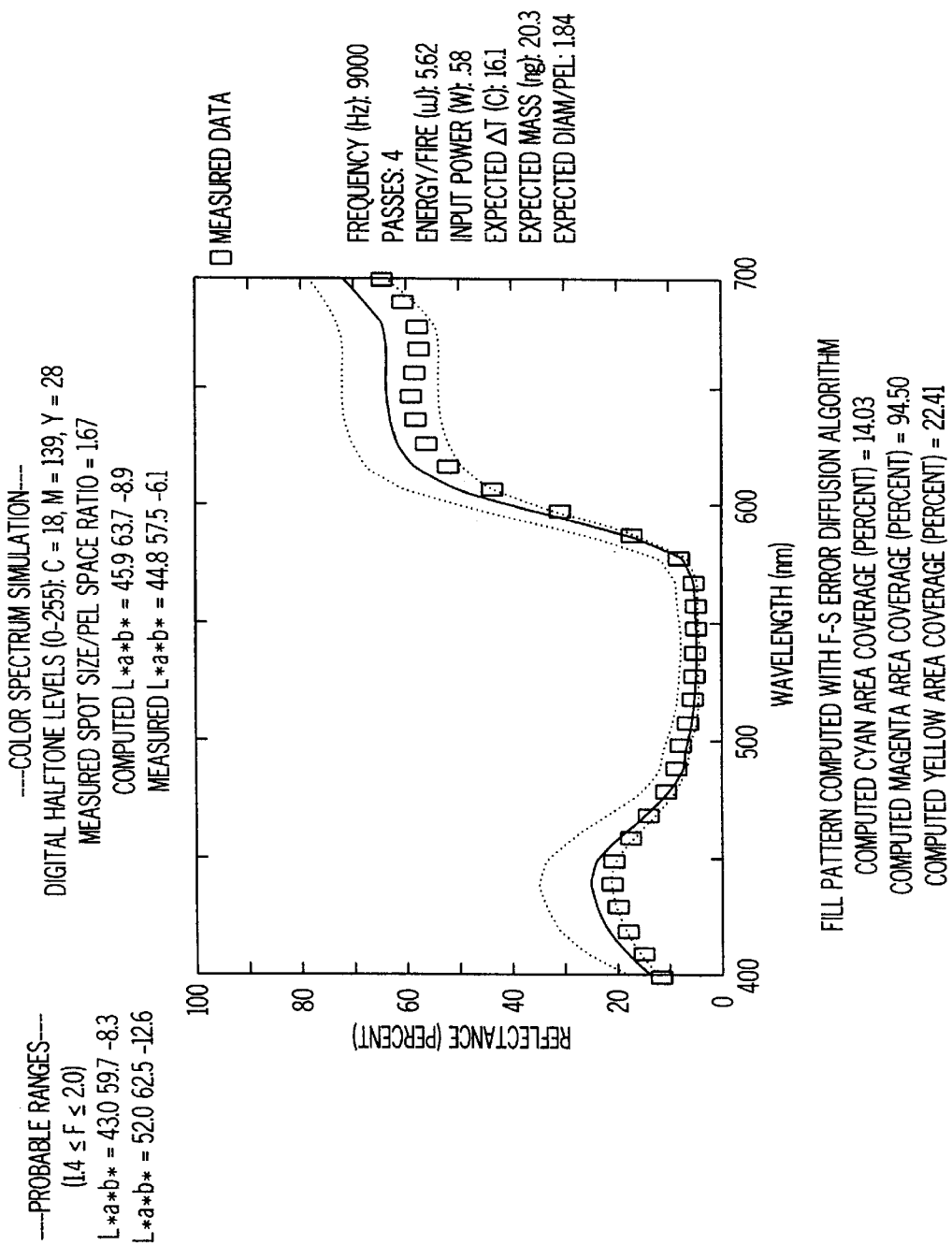

Peak absorption wavelengths for each primary are readily apparent in FIGS. 23a, 24a and 25a. The Unit (K/S) curves for the three primaries are respectively shown in FIGS. 23b, 24b and 25b.

One final step remains before the halftone mixing equation can be used—computing the effective concentration factors. It is apparent that each primary ink has a relatively narrow bandwidth where absorption is at a maximum. When $(K/S)_2$ at the peak absorption wavelength is plotted against area fill, it is evident that a relationship exists. These relationships are shown for the CMY inks in FIGS. 13–15. Regression analysis on the data provides the following concentration factors for the CMY inks as a function of fill fraction. For example, the Lexmark 7000 inks follow these regression equations that convert area fill into effective ink concentration factors.

$$C_{C1} = 8.05(A_{C1})^{1.19} \text{ Cyan Effective Concentration} \quad (15)$$

$$C_{M1} = 8.65(A_{M1})^{1.26} \text{ Magenta Effective Concentration} \quad (16)$$

$$C_{Y1} = 8.25(A_{Y1})^{1.75} \text{ Yellow Effective Concentration} \quad (17)$$

The $A_{CMY}$ terms in these equations are fractional area fills, computed as described earlier.

Characterization of the ink and paper is now complete. All of the terms required to solve the halftone mixing equation (10) are now known. Knowing spot size and pel space, an (F) value is computed with equation (11). Then a table is created for digital levels 0–255 for this value of (F). Then for any given combination of CMY levels from 0–255, the fill fraction of each primary is pulled from this table. Then using these fill fractions the effective ink concentrations are computed with equations (15–17). Then equation (10) is solved for $(K/S)_{halftone}$. Knowing this, the spectral reflectance for this color can be computed by:

$$R(\lambda) = 1 + (K/S)_{halftone} - [(K/S)_{halftone}^2 - 2(K/S)_{halftone}]^{0.5} \quad (18)$$

Where: $R(\lambda)$=spectral reflectance of the halftone (400 nm<$\lambda$<700 nm)

Finally, knowing the spectral reflectance of the halftone it is possible to compute the CIE tristimulus values (X,Y,Z) and the L*a*b* color coordinates using well known numerical techniques.

A total of 100 verification samples were measured with a spectrophotometer for comparison to the simulation results. The verification samples includes a wide range of primary, secondary and tertiary halftone colors. FIGS. 26–33 show several illustrative halftone simulations and the corresponding measured spectral reflectance of the printed swatches. In these figures, the square blocks represent measured data points. The solid curve is the simulation result for the approximate spot size of the measured swatch, and the two dashed curves represent simulation results for the probable spot size range (random print head variables and thermally induced drop mass variations). In each case the predicted response follows the measured response reasonably well.

Figure 34:
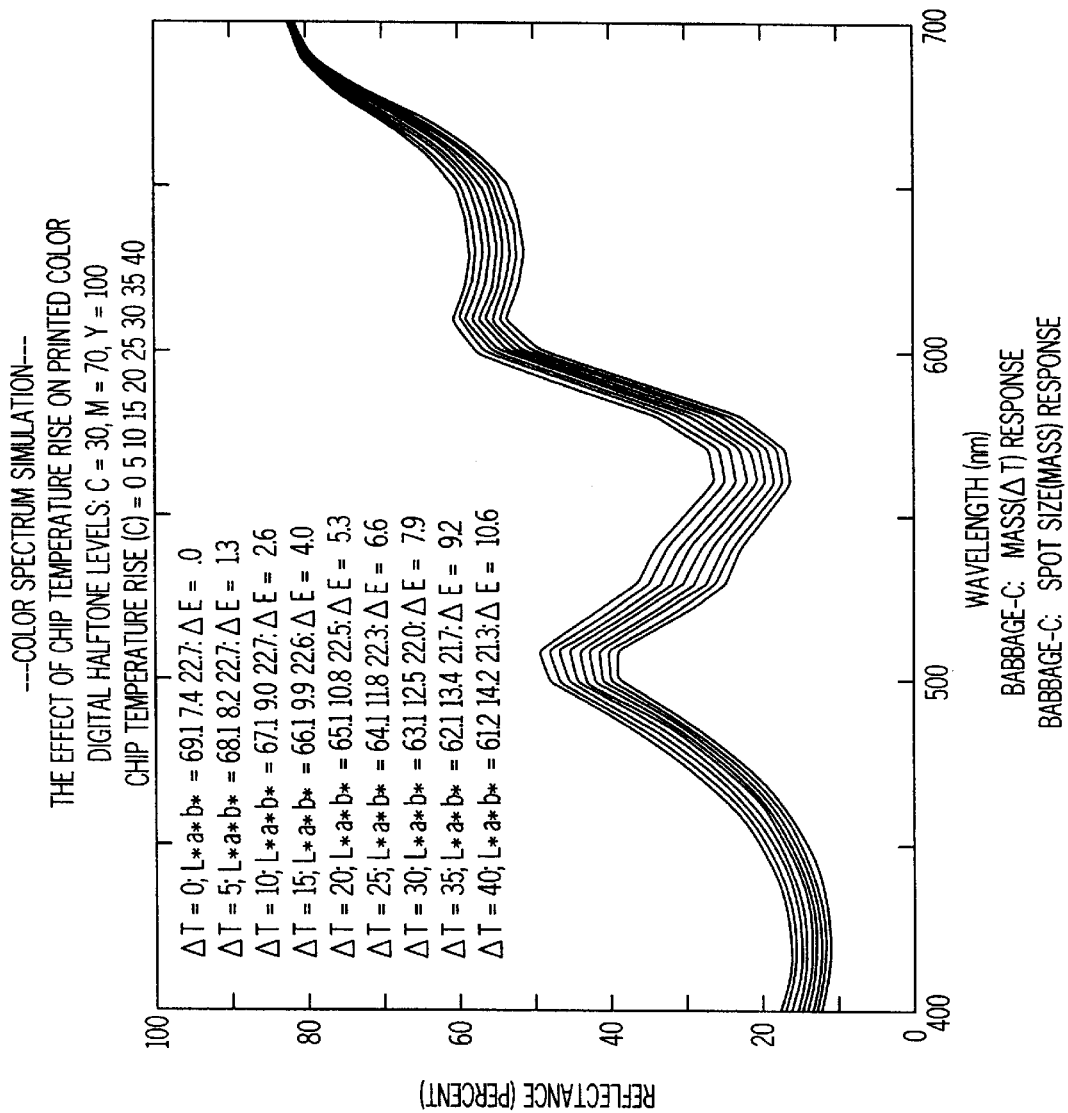

Thermally induced color shifts will now be discussed. Now that the model exists, and seems to be a reasonable color prediction tool, it can be used to define the swath to swath temperature control limits that are required to avoid visible color shifts. FIG. 34 shows an illustrative example. The spectral reflectance curves plotted here show the influence of $\Delta T$ on $\Delta E$ for a specific digital halftone.

Figure 20:
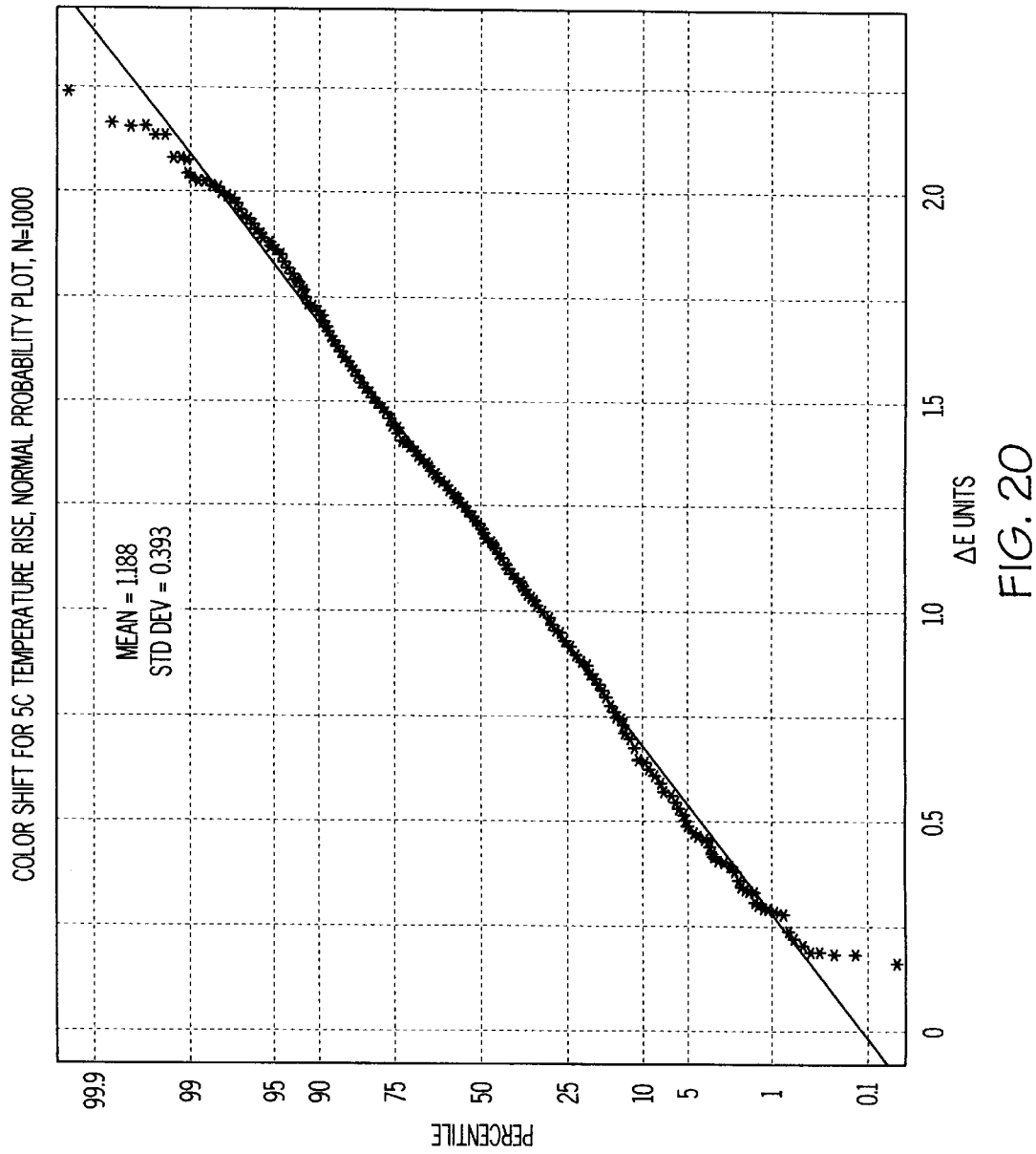
FIG. 20 is a graph showing color shifts for a 5C temperature rise.
Figure 21:
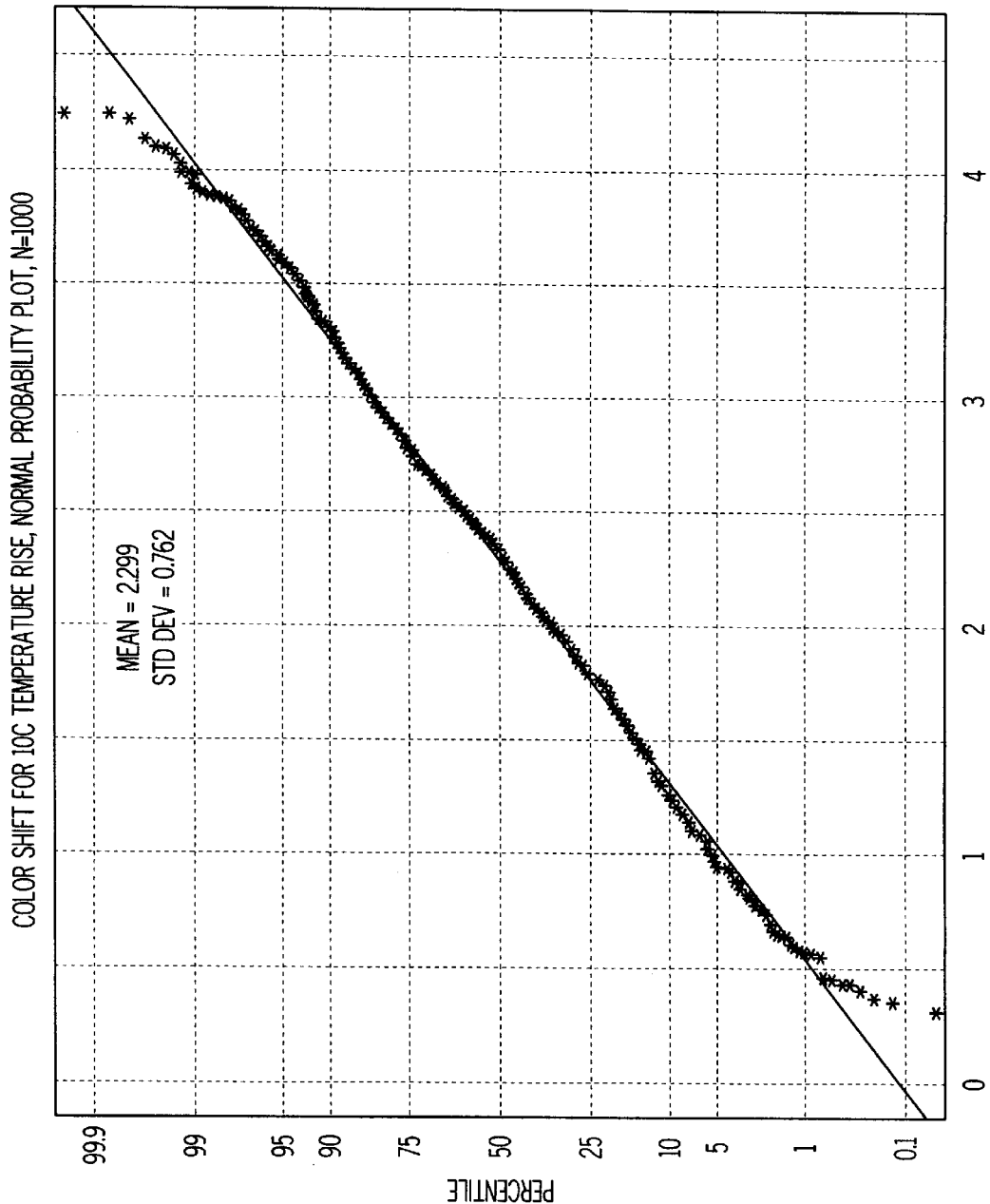
FIG. 21 is a graph showing color shifts for a 10C temperature rise.

Even with the help of a model, there are limits to how much simulation is possible before we run out of computing power. To simulate 16.7 million colors at 10 different spot size-chip temperature combinations might be impractical and pedantic. With the help of statistics, the infinites can be handled appropriately. The model was asked to create 1000 random CMY combinations and to simulate these colors across a wide range of temperatures. The results were then sorted and fit to a set of normal distributions. FIG. 20 shows the normal cumulative distribution function applied to the 1000 sample colors with a 5° C. temperature rise. Similarly, FIG. 21 applies to a 10° C. rise.

Figure 22:
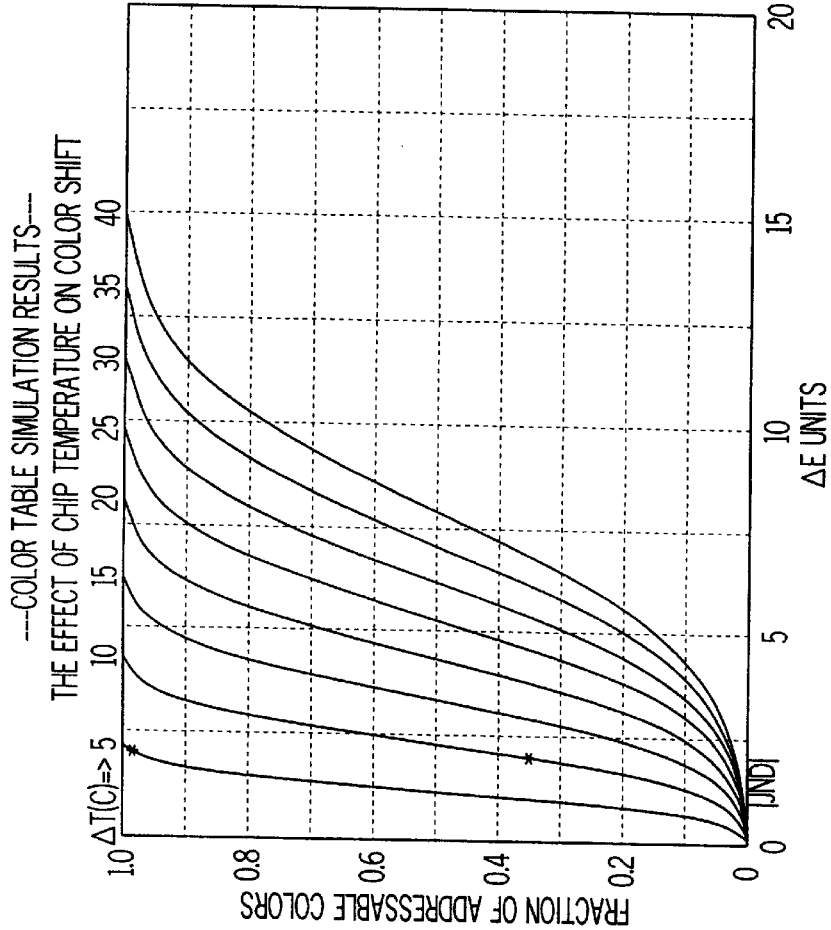
FIG. 22 is a graph showing color simulation results as the fraction of addressable colors vs. ΔE units.

The distribution statistics were compiled for all 1000 colors across all temperatures simulated, and the results are shown in FIG. 22. This figure shows the fraction of addressable colors that will have a just noticeable color shift (JND) for swath to swath temperature variations from 5 to 40° C. There is no crisp answer in the literature with regards to JND across all colors, so for this analysis it was assumed that a just noticeable color shift was one or two $\Delta E$ units in the L*a*b* color coordinate system. Obviously, the smaller the swath to swath temperature difference, the larger the fraction of addressable colors that can be printed without a visible color shift.

A 35° C. temperature rise causes droplet mass to increase from 18 ng to 23 ng, a 27% gain. Left uncompensated, this increase is not only responsible for color shifts, it also means more ink on the paper—and more cockle. Aside from the unsightly appearance of cockle, it increases the probability of smearing as the head shuttles back and forth. Multiple color tables compensate for thermally induced drop mass shifts by decreasing the number of droplets required to make the image. This will help reduce the cockle and smear probability.

No attempt was made in the model explained above to account for the order in which the primary inks were applied. However, it is well known that order matters in a real ink jet printer. C→M→Y colors look different than C←M←Y colors. It is suspected that the reason for this can also be explained by spot size variation. The size of the dot is going to be dependent on the way ink is absorbed into the paper fibers, and the paper absorbency is going to be a function of whether the droplet hits a wet spot or whether it hits a dry spot. Hitting a wet spot will cause more spreading and feathering than hitting a dry spot, and a different color should be expected. With this in mind, it is further hypothesized that (C→M→Y) (C←M←Y) color shifts will be minimized if the paper is allowed to substantially dry between the application of successive primaries. This influence of drytime and the associated spot size induced color shift is a consideration that should be taken into account when bi-directional color printing is implemented.

No attempt was made in the model explained above to simulate whether the halftones were formed by dot-on-dot, or dot-next to-dot. The only dot position considerations that were made in the model were to assume an error diffusion pattern and to account for the local overlap conditions when the fill fractions were computed. This method seems to work well for error diffusion. It is also expected to work well for ordered dither patterns.

The objective of the color simulation model explained above was not to eliminate the step of empirical color table creation based on a small sampling of the addressable colors. There is at least as much effort required to compute the coefficients for the digital halftone model as there is to simply measure a few hundred color swatches. However, empirical methods may become impractical if it is attempted to extend them to account for the varying drop masses that actually occur in a real printing environment, or to extend them to predict the likely color ranges that could be expected due to random variations, or even just to collect a statistically significant data base.

This color simulation model explained above discloses a technique that can be used to simulate the ranges of halftone colors that may be expected when variables, both random and causal, are at work. The technique not only allows digital halftone color prediction for varying spot sizes, it is also extendible to digital printing systems consisting of multiple ink dilutions. The halftone mixing equation, and the methods shown for characterizing the ink and paper can be applied to the diluted ink set currently used for photo ink jet applications.

To prevent visible color shifts across 98% of the addressable colors, it is required to control the swath-swath temperature variation to 5C. A 10C line to line variation in temperature will cause visible color shifts in about 65% of the addressable colors. Multiple color tables may be simulated with this model and applied to the printer driver—print head temperature control system to make this swath-swath limit less restrictive.

The foregoing examples and various preferred embodiments of the present invention set forth herein are provided for illustrative purposes only and are not intended to limit the scope of the invention defined by the claims. Additional embodiments of the present invention and advantages thereof will be apparent to one of ordinary skill in the art and are within the scope of the invention defined by the following claims.

What is claimed is:

1. An image processing apparatus for use in a binary printer, the apparatus comprising:
    a. a temperature estimation unit adapted to estimate an effective temperature of a print head based upon a number of print dots within a predetermined portion of a printable image; and
    b. a color correction unit adapted to receive the estimated temperature from the temperature estimation unit, adapted to receive color image data corresponding to a number of dots to be printed per unit area, and adapted to generate corrected color image data based upon the estimated temperature and the received color image data so as to modify the number of dots to be printed per unit area.

2. The image processing apparatus according to claim 1, further comprising a color ink jet print head which is controlled to print out the corrected color image data generated by the color correction unit.

3. The image processing apparatus according to claim 1, wherein the temperature estimation unit estimates the temperature based upon the corrected color image data generated by the color correction unit for the predetermined portion of the image.

4. The image processing apparatus according to claim 3, wherein the predetermined portion of the image is the portion between a start of a swath and a current position in the image.

5. The image processing apparatus according to claim 3, wherein the predetermined portion of the image is the portion between a pause in the printing and a current position in the image.

6. The image processing apparatus according to claim 1 wherein the color correction unit comprises:
    a. a color correction look-up table storage unit adapted to store look-up tables for a plurality of different print head temperatures;
    b. a color correction circuit for generating the corrected color image data from the look-up tables stored in the color correction look-up table storage unit based upon the temperature estimated by the temperature estimation unit and the received color image data; and
    c. a binarization unit for determining the number of dots of at least two colors to be printed based upon the corrected color image data.

7. An image processing apparatus for use in a binary printer, the apparatus comprising:
    a. a temperature estimation unit for estimating an effective temperature of a print head based upon a number of print dots within a predetermined portion of a printable image; and
    b. a color correction unit for receiving the estimated temperature, for receiving image data in the form of nominal halftone color values corresponding to at least two colors, and for determining binary halftone color values based on the estimated print head temperature and the nominal halftone color values.

8. The image processing unit according to claim 7, further comprising:
    a. a color ink jet print head for printing dots of the at least two colors by binary ink jet printing; and
    b. a print head driver unit for receiving the binary halftone color values and for controlling the color ink jet print head to print dots according to the binary halftone color values.

9. The image processing apparatus according to claim 7, further comprising an image data storage unit for storing at least a portion of the image data and for sending the image data to the color correction unit.

10. The image processing apparatus according to claim 7, wherein the temperature estimation unit estimates the temperature based upon the binary halftone color values for some predetermined portion of the image.

11. The image processing apparatus according to claim 10, wherein the predetermined portion of the image is the portion between a start of a swath and a current position in the image.

12. The image processing apparatus according to claim 7, wherein the temperature estimation unit directly measures the temperature of at least a portion of the print head.

13. The image processing apparatus according to claim 7, wherein the color correction unit comprises:
  a. a color correction look-up table storage unit for storing look-up tables for a plurality of different print head temperatures;
  b. a color correction circuit for determining corrected halftone color values from the look-up tables stored in the color correction look-up table storage unit based upon the temperature estimated by the temperature estimation unit and the nominal halftone color values; and
  c. a binarization unit for determining the binary halftone color values according to a halftone algorithm based on the corrected halftone color values.

14. The image processing apparatus according to claim 13, wherein the binarization unit compares the corrected halftone color values to values in a threshold array to determine the binary halftone color values.

15. The image processing apparatus according to claim 7, wherein the color correction unit comprises a binarization unit which applies a halftone algorithm to the nominal corrected color values to determine the binary halftone color values, with parameters of the halftone algorithm being adjusted based upon the estimated temperature.

16. The image processing apparatus according to claim 15, wherein the binarization unit adjusts the values in a thresholding array based upon the estimated temperature.

17. A method of processing image data for printing by a binary printer, the method comprising the steps of:
  a. estimating an effective print head temperature;
  b. providing image data in the form of nominal halftone color values corresponding to at least two colors, the nominal halftone color values representing probabilities that dots will be printed within a predetermined area of the image;
  c. correcting the nominal halftone color values based upon the estimated temperature so as to adjust the probabilities that dots will be printed within the predetermined area of the image and thereby adjust the number of dots to be printed within the area; and
  d. determining binary halftone color values based on the corrected nominal halftone color values, the binary halftone color values indicating whether or not to print dots at locations in the image.

18. The method of claim 17, further comprising the step of printing dots of ink of at least two colors by a binary ink jet print head corresponding to the binary halftone color values.

19. An image processing apparatus for use in a binary printer, the apparatus comprising:
  a. a temperature estimation unit adapted to estimate an effective temperature of a print head;
  b. a color correction unit adapted to receive the estimated temperature from the temperature estimation unit, adapted to receive color image data, and adapted to generate corrected color image data based upon the estimated temperature and the received color image data;
  wherein the temperature estimation unit estimates the temperature based upon the corrected color image data generated by the color correction unit for some predetermined portion of the image.

20. The image processing apparatus according to claim 19, wherein the predetermined portion of the image is the portion between a start of a swath and a current position in the image.

21. The image processing apparatus according to claim 19, wherein the predetermined portion of the image is the portion between a pause in the printing and a current position in the image.

22. An image processing apparatus for use in a binary printer, the apparatus comprising:
  a. a temperature estimation unit for estimating an effective temperature of a print head; and
  b. a color correction unit for receiving the estimated temperature, for receiving image data in the form of nominal halftone color values corresponding to at least two colors, and for determining binary halftone color values based on the estimated print head temperature and the nominal halftone color values;
  wherein the temperature estimation unit estimates the temperature based upon the binary halftone color values for some predetermined portion of the image.

23. The image processing apparatus according to claim 22, wherein the predetermined portion of the image is the portion between a start of a swath and a current position in the image.

24. A method of producing a color halftone image, the method comprising the steps of:
  a. estimating a print head temperature;
  b. providing binary halftone image data corresponding to at least two colors, the binary halftone image data representing a number of dots to be printed within a predetermined area of the image;
  c. adjusting the binary halftone image data based upon the estimated temperature in order to modify the number of dots to be printed within the predetermined area of the image; and
  d. driving a printhead to selectively deposit dots at various locations according to the adjusted binary halftone image data, so as to produce a binary halftone image.

* * * * *